United States Patent
Nguyen et al.

(10) Patent No.: US 10,788,722 B2
(45) Date of Patent: Sep. 29, 2020

(54) ELECTROCHROMIC DEVICES AND METHOD FOR FORMING SUCH DEVICES

(71) Applicant: Clearist, Inc., Milpitas, CA (US)

(72) Inventors: Paul P. Nguyen, San Jose, CA (US); Zhongchun Wang, Sunnyvale, CA (US); Nelson R. Holcomb, Morgan Hill, CA (US)

(73) Assignee: CLEARIST INC., Milpitas, CA (US)

( * ) Notice: Subject to any disclaimer, the term of this patent is extended or adjusted under 35 U.S.C. 154(b) by 591 days.

(21) Appl. No.: 15/360,972

(22) Filed: Nov. 23, 2016

(65) Prior Publication Data

US 2017/0075182 A1    Mar. 16, 2017

Related U.S. Application Data

(63) Continuation of application No. 14/214,712, filed on Mar. 15, 2014, now abandoned, which is a
(Continued)

(51) Int. Cl.
*G02F 1/153* (2006.01)
*G02F 1/1503* (2019.01)
(Continued)

(52) U.S. Cl.
CPC .......... *G02F 1/1533* (2013.01); *G02F 1/1347* (2013.01); *G02F 1/1503* (2019.01); *G02F 1/155* (2013.01); *G02F 1/1523* (2013.01); *G02F 2001/133357* (2013.01); *G02F 2001/1536* (2013.01); *G02F 2202/38* (2013.01)

(58) Field of Classification Search
None
See application file for complete search history.

(56) References Cited

U.S. PATENT DOCUMENTS

| 4,460,434 A | 7/1984 | Johnson et al. |
| 5,900,275 A | 5/1999 | Cronin et al. |

(Continued)

FOREIGN PATENT DOCUMENTS

| CN | 102388340 A | 3/2012 |
| JP | 2001188264 A | 7/2001 |

(Continued)

OTHER PUBLICATIONS

Alcantara et al., "Lithium-Nickel Citrate Precursors for the Preparation of LiNiO2 Insertion Electrodes," Chem. Mater. 9, pp. 2145-2155 (1997).

(Continued)

*Primary Examiner* — William R Alexander
*Assistant Examiner* — Gary W O'Neill
(74) *Attorney, Agent, or Firm* — Caesar Rivise, PC

(57) ABSTRACT

An electrochromic device is disclosed which has a plurality of layers, including at least one planarizing layer having an upper surface roughness which is less than or equal to half of the upper surface roughness of an underlying layer in contact with a lower surface of the at least one planarizing layer, wherein at least valleys of the underlying layer are filled by the lower surface of the at least one planarizing layer. A method for fabricating the electrochromic device is also disclosed.

15 Claims, 4 Drawing Sheets

Related U.S. Application Data continuation of application No. 14/294,952, filed on Jun. 3, 2014, now Pat. No. 10,310,351, which is a continuation of application No. 13/427,756, filed on Mar. 22, 2012, now Pat. No. 8,780,432.

(60) Provisional application No. 61/800,708, filed on Mar. 15, 2013, provisional application No. 61/466,335, filed on Mar. 22, 2011.

(51) Int. Cl.
*G02F 1/1523* (2019.01)
*G02F 1/155* (2006.01)
*G02F 1/1347* (2006.01)
*G02F 1/1333* (2006.01)

(56) References Cited

U.S. PATENT DOCUMENTS

| | | | |
|---|---|---|---|
| 6,094,292 | A | 7/2000 | Goldner et al. |
| 6,277,523 | B1 | 8/2001 | Giron |
| 6,664,137 | B2 | 12/2003 | Weaver |
| 6,859,297 | B2 | 2/2005 | Lee et al. |
| 7,535,624 | B2 | 5/2009 | Amundson et al. |
| 8,780,432 | B1 | 7/2014 | Nguyen |
| 9,904,138 | B2 | 2/2018 | Kailasam et al. |
| 2005/0085050 | A1 | 4/2005 | Draney et al. |
| 2006/0110319 | A1 | 5/2006 | Seok et al. |
| 2007/0139756 | A1* | 6/2007 | Agrawal .............. G02F 1/15 359/265 |
| 2007/0206263 | A1 | 9/2007 | Neuman et al. |
| 2008/0252202 | A1* | 10/2008 | Li ..................... H01L 25/048 313/504 |
| 2010/0243427 | A1 | 9/2010 | Kozlowski et al. |
| 2011/0051220 | A1 | 3/2011 | Lee |
| 2011/0059369 | A1 | 3/2011 | Nan et al. |
| 2011/0151283 | A1 | 6/2011 | Gillaspie et al. |
| 2011/0217455 | A1* | 9/2011 | Veerasamy ............ C09D 11/54 427/122 |
| 2011/0272682 | A1* | 11/2011 | Blizzard ............. H01L 51/0097 257/40 |
| 2012/0187399 | A1* | 7/2012 | Fukuda ............. H01L 29/78603 257/43 |
| 2013/0017449 | A1 | 1/2013 | Yasuda et al. |
| 2013/0182307 | A1* | 7/2013 | Gillaspie .................. C09K 9/00 359/265 |
| 2013/0258439 | A1 | 10/2013 | Naijo et al. |
| 2014/0234583 | A1* | 8/2014 | Ryu ..................... G02B 5/0294 428/142 |

FOREIGN PATENT DOCUMENTS

| | | |
|---|---|---|
| JP | 2002311450 A | 10/2002 |
| JP | 2007101885 A | 4/2007 |
| JP | 2013101309 A | 5/2013 |
| WO | 2011132369 A1 | 10/2011 |
| WO | 2013013135 A1 | 1/2013 |

OTHER PUBLICATIONS

Ammundsen et al., "Novel lithium-ion cathode materials based on layered manganese oxides," Adv. Mater. 13(12-13), pp. 943-956 (2001).

Kang et al., "Synthesis and Electrochemical Properties of Layered Li0.9Ni0.45Ti0.55O2," Chem. Mater. 15, pp. 4503-4507 (2003).

Lu et al., "Layered Cathode Materials Li [NixLi (1/3-2x /3)Mn(2/3-x/3 )]O2 for Lithium-Ion Batteries," Electrochem. Solid State Lett. 4(11) pp. A191-A194 (2001).

Ohzuku et al., "Layered Lithium Insertion Material of LiNi1/2Mn1/2O2 : A Possible Alternative to LiCoO2 for Advanced Lithium-Ion Batteries," Chem. Lett. 30(8), pp. 744-745 (2001).

Reed et al., "Charge, Potential, and Phase Stability of Layered Li(Ni0.5Mn0.5 ) O2," Electrochem. Solid State Lett. 5(7), pp. A145-A148 (2002).

Williams et al., "Synthesis and crystal structures of dimethylaminoethanol adducts of Ni(II) acetate and Ni(II) acetylacetonate precursors for the sol-gel deposition of electrochromic nickel oxide thin films," J. Mater. Chem. 11 , pp. 2329-2334 (2001).

Zhong et al., "Synthesis and Electrochemistry of LiNixMn2-xO4," Electrochem. Soc., 144(1), pp. 205-213 (1997).

International Search Report from PCT/US2014/046292 dated Apr. 17, 2015.

English Abstract for JP 2002311450 A (2002).

English Abstract for JP 2013101309 A (2013).

English Abstract for JP 2007101885 A (2007).

* cited by examiner

ELECTROCHROMIC DEVICES AND METHOD FOR FORMING SUCH DEVICES

BACKGROUND OF THE INVENTION

Field of the Invention

Embodiments of the invention generally relate to electrochromic devices and materials and processes for forming such electrochromic devices and materials.

Description of the Related Art

Electrochromic refers to the ability of certain materials to change color when an electrical charge is applied. In the 1930s, bulk tungsten oxide was first shown to change color electrochemically. Electrochromic switchable rearview mirrors based on tungsten oxide and viologens were developed successfully in the 1980s and are used widely in automobiles today. In the 1990s, development of electrochromic thin films for architectural glazing was initiated by several companies, although their efforts have not yet resulted in widespread applications in the building industry primarily because of the high cost and durability issues.

There are different types of electrochromic materials and structures which are used for different application purposes. Inorganic and substantially inorganic electrochromic thin film materials, superimposed in a multilayer structure, are typically used for architectural window applications because of a high durability with respect to heat and ultraviolet radiation. Although electrochromic rearview mirrors for automobiles based on liquid or polymeric electrochromes have been successfully marketed, more widespread use of electrochromic devices in applications such as eyewear, display, architectural windows and skylights, etc. have not been realized, mainly because of the high cost, low cycling durability, and inadequate switching range and speed.

Various different deposition techniques have been used to date to fabricate EC thin films. Among the most popular techniques are vacuum deposition techniques such as sputtering, thermal and electron beam evaporation, and chemical vapor deposition (CVD). These deposition techniques, especially for large-area applications, suffer from at least one of the following problems: i) complex and expensive vacuum system; ii) slow deposition rate; iii) expensive source materials; iv) expensive maintenance; v) nonuniformity of the deposited films; and vi) low yield.

Alternatively, wet deposition techniques have also been used. Sol-gel techniques have been used to deposit some of the layers within a EC device. While sol-gel is a cost-effective technique, it suffers from drawbacks such as slow throughput and significant chemical solution waste. Besides sol-gel, electrodeposition also is used to deposit both the primary and secondary EC layers. Although electrodeposition can be inexpensive, it is difficult to deposit mixtures of metal oxides, and multilayers, as well as to maintain good film uniformity across large-area devices. Besides sol-gel and electrodeposition, spray pyrolysis (SP) has been used to produce single EC layers at different substrate temperatures. The EC layers formed by SP might be exposed to a heat treatment after the SP process—which leads to increased time and cost. To fabricate EC devices, single EC layers are usually laminated together via a polymer ion conductor or an organically modified electrolyte (ormolyte). Lamination increases the production complexity and hence cost, as well as adding additional weight which can be substantial if glass substrates are utilized within the EC devices. Furthermore, organic or ormolyte ion conductors increase the risk of degradation when exposed to heat and/or ultraviolet radiation.

Roughness of the substrate or one or more of the layers in an electrochromic multilayer stack can affect the other layers deposited above, increasing light scattering and haze, as well as increasing pinholes and electrical shorts.

Therefore, there is a need for electrochromic devices and materials with improved properties, such as higher switching range, speed, and cycling durability, as well as minimized light scattering, haze, pinholes, and electrical shorts. Also, a process for forming such electrochromic devices and materials at a reduced cost of manufacturing and increased throughput is desirable over previous processes, especially for large-area applications.

SUMMARY OF THE INVENTION

A first aspect of the invention is an electrochromic device comprising a plurality of layers, including at least one planarizing layer having an upper surface roughness which is less than or equal to half of the upper surface roughness of an underlying layer in contact with a lower surface of the at least one planarizing layer, wherein at least valleys of the underlying layer are filled by the lower surface of the at least one planarizing layer.

In certain embodiments, the electrochromic device comprises: at least one substrate; lower transparent conductor layer; a first electrochromic layer; an ion conductor layer; a second electrochromic layer; and an upper transparent conductor layer, wherein: (a) the first electrochromic layer is a primary electrochromic layer and the second electrochromic layer is a secondary electrochromic layer, or (b) the first electrochromic layer is the secondary electrochromic layer and the second electrochromic layer is the primary electrochromic layer.

In certain embodiments, the secondary electrochromic layer comprises a composition represented by the formula $Li_aNiM1_xM2_yO_z$, where M1 and M2 are different elements and are selected from the group consisting of B, Mn, Ti, Co, Zr, Al, P, Si, Ru, Ta, Nb, Mo, W, Ir, V, Cr, N, and combinations thereof, where a is from 1 to 5; x is from 0 to 1; y is from 0 to 1; and z is from 1.5 to 6, provided that $x+y>0$.

In certain embodiments, a is 1-5 or 1.5-4.5 or 1.5-2.5 or 1.8-2.2 or 2.

In certain embodiments, x is 0-1 or 0.1-1 or 0.5-0.8.

In certain embodiments, y is 0-1 or 0.01-1 or 0.05-0.1 or 0.2-0.6.

In certain embodiments, z is 1.5-8 or 2-6 or 2-5 or 2.5-4.5.

In certain embodiments, the secondary electrochromic layer comprises a hygroscopic material.

In certain embodiments, the secondary electrochromic layer comprises a large-grain thin film mixture, wherein a refractive index of a component material of the secondary electrochromic layer is similar to a refractive index in a bleached state, but different from a refractive index in a colored state, of remaining component materials of the secondary electrochromic layer.

In certain embodiments, a Li ion storage capacity of the secondary electrochromic layer is greater than 80 mC/cm$^2$/um, or is at least 100 mC/cm$^2$/um or is at least 120 mC/cm$^2$/um.

In certain embodiments, a coloration efficiency of the secondary electrochromic layer is lower than 35 cm$^2$/C or lower than 30 cm$^2$/C, or as low as 25 cm$^2$/C, or 25-30 cm$^2$/C.

In certain embodiments, the secondary electrochromic layer has a transmittance of at least 50% of light in a bleached state, and no more than 20% of light in a colored state, where the light has a wavelength within a range from 400 nm to 950 nm.

In certain embodiments, the secondary electrochromic layer is formed from a precursor solution comprising a nickel precursor selected from the group consisting of nickel nitrate, nickel acetate, nickel chloride, nickel acetylacetonate and nickel carbonate hydroxide, and a lithium precursor selected from the group consisting of lithium nitrate, lithium carbonate, lithium acetate, lithium hydroxide, and lithium trifluoromethanesulfonate.

In certain embodiments, there is only one substrate and the layers constitute a monolithic stack.

In certain embodiments, there are two substrates and the electrochromic device is in a form of a laminate.

A second aspect of the invention is a method for fabricating the electrochromic device of the invention. The method comprises forming the first electrochromic layer on an upper surface of the lower transparent conductor layer disposed on the at least one substrate; forming the ion conductor layer on an upper surface of the first electrochromic layer; forming the second electrochromic layer on an upper surface of the ion conductor layer; and forming the upper transparent conductor layer on an upper surface of the second electrochromic layer, wherein the at least one planarizing layer is formed by at least one technique selected from the group consisting of dip coating, spin coating, electrophoresis, inkjet printing, roll coating, spray coating, spray pyrolysis, electrostatic coating, meniscus coating, curtain coating, sputtering, evaporation and chemical vapor deposition.

In certain embodiments of the method, the secondary electrochromic layer is formed from a precursor solution.

In certain embodiments of the method, the precursor solution comprises a nickel precursor compound selected from the group consisting of nickel nitrate, nickel acetate, nickel chloride, nickel acetylacetonate, and nickel carbonate hydroxide, and a lithium precursor compound selected from the group consisting of lithium nitrate, lithium carbonate, lithium acetate, lithium hydroxide, and lithium trifluoromethanesulfonate.

In certain embodiments of the method, the precursor solution further comprises at least one metal compound selected from the group consisting of manganese (III) acetylacetonate, manganese (II) carbonate, manganese (II) chloride, manganese (II, III) oxide, manganese (II) acetate, manganese (III) acetate, cobalt (III) acetylacetonate, cobalt (II) carbonate, cobalt (II) chloride, cobalt (II, III) oxide, cobalt (II) stearate, iridium (III) acetylacetonate, iridium (III) chloride, iridium (IV) oxide, ruthenium (III) acetylacetonate, ruthenium (III) chloride, ruthenium (IV) oxide, ruthenium (III) iodide, ammonium tungstate, tungsten ethoxide, tungsten chloride, tungsten (VI) oxide, tungstic acid, peroxotungstic acid, and ammonium metatungstate, tantalum (V) chloride, tantalum (V) ethoxide, tantalum (V) oxide, tantalum (V) iodide, niobium (III) acetylacetonate, niobium (V) chloride, niobium (V) ethoxide, niobium (IV) ethylhexanoate, niobium (V) oxide, titanium(IV) butoxide, titanium(IV) isopropoxide, titanium(IV) chloride, titanium (IV) oxide, peroxotitanic acid, titanium(IV) oxysulfate, vanadium (III) acetylacetonate, vanadium (III) chloride, vanadium (V) oxide, zirconium (IV) acetylacetonate, zirconium (IV) t-butoxide, zirconium (IV) carbonate, zirconium (IV) chloride, zirconium (IV) ethoxide, zirconium (IV) oxide, and zirconium (IV) i-propoxide.

In certain embodiments of the method, the precursor solution further comprises: at least one solvent selected from the group consisting of ethanol, isopropanol, methanol and water; at least one surfactant selected from the group consisting of BRIJ 30, cetyltrimethylammonium bromide, sodium dodecyl sulfate and sodium stearate; at least one organic carrier selected from the group consisting of citric acid, adipic acid, maleic acid, acrylic acid, glycolic acid, beta-diketones, glycols, alkanolamines, ethylenediamine, poly(ethylene glycol), poly(acrylic acid), poly(vinylpyrrolidone), and poly(vinylbutyral); and at least one structural promoter ion selected from the group consisting of Mn, Co, Ir, Ru, Cr, Mo, W, Ta, Nb, V, Zr and Ti ions.

In certain embodiments of the method, the at least one solvent, the at least one organic carrier and the at least one surfactant is removed from the precursor solution by application of a cold plasma or a thermal plasma.

In certain embodiments of the method, the method includes at least one of the following features: (a) combustion heat generated from the at least one organic carrier during calcination enhances crystallization of the secondary electrochromic layer; (b) the at least one organic carrier increases a viscosity and a wettability of the precursor solution; and (c) the at least one structural promoter ion increases a diffusion coefficient of lithium ions and/or improves a microstructural stability during cycling.

In certain embodiments of the method, the at least one organic carrier is a member selected from the group consisting of ethanolamine, diethanolamine and triethanolamine.

In certain embodiments, the method further comprises calcination of at least one layer, wherein a calcination temperature does not exceed 350° C.

In certain embodiments of the method, the secondary electrochromic layer is formed by at least one technique selected from the group consisting of dip coating, spin coating, electrophoresis, inkjet printing, roll coating, spray coating, spray pyrolysis, electrostatic coating, meniscus coating, curtain coating, sputtering, evaporation and chemical vapor deposition.

In certain embodiments of the method, all layers are deposited onto one substrate to form a monolithic multilayer stack.

In certain embodiments of the method, some layers are deposited onto a first substrate and other layers are deposited onto a second substrate, and the first substrate and the second substrate are laminated together to provide a laminate configuration.

In certain embodiments, the method is free of a separate lithium intercalation step.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
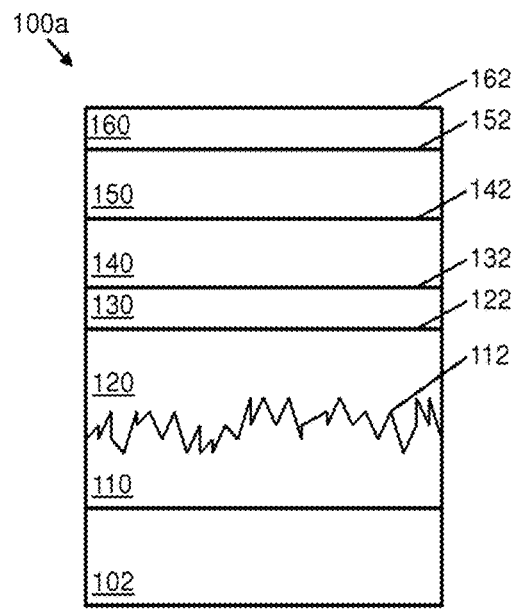
FIGS. 1A-1B depict electrochromic multilayer stack devices, as described by embodiments herein.

Embodiments of the invention generally provide electrochromic devices and materials and processes for forming such electrochromic devices and materials. In one embodiment, an electrochromic device contains a lower transparent conductor layer disposed on a substrate, wherein an upper surface of the lower transparent conductor layer has a surface roughness of greater than 50 nm and a primary electrochromic layer having planarizing properties is disposed on the upper surface of the lower transparent conductor layer. The upper surface of the primary electrochromic layer has a surface roughness that is less than the surface roughness of upper surface of the lower transparent conductor layer, such as about 50 nm or less. The electrochromic device further contains an ion conductor layer disposed on the upper surface of the primary electrochromic layer, a secondary electrochromic layer disposed on an upper surface of the ion conductor layer, an upper transparent conductor layer disposed on an upper surface of the secondary electrochromic layer, and an antireflection layer disposed on an upper surface of the upper transparent conductor layer. In some embodiment, each of the aforementioned layers that form the electrochromic device may have a surface roughness that is equal to or less than the surface roughness of the adjacent and underlying layer disposed underneath.

The upper surface of the lower transparent conductor layer generally has a surface roughness of greater than 50 nm, such as within a range from greater than 50 nm to about 300 nm, more narrowly within a range from greater than 50 nm to about 200 nm, and more narrowly within a range from greater than 50 nm to about 100 nm. In many examples, the upper surface of the lower transparent conductor layer has a surface roughness within a range from about 60 nm to about 100 nm, more narrowly within a range from about 70 nm to about 80 nm, such as about 75 nm. Therefore, the primary electrochromic layer—having planarizing properties is disposed on or over the lower transparent conductor layer. The newly formed field across the exposed substrate (i.e., the upper surface of the primary electrochromic layer) is much smoother or less rough than the now underlying upper surface of the lower transparent conductor layer. The upper surface of the primary electrochromic layer has a surface roughness of about 50 nm or less, such as within a range from about 1 nm to about 50 nm, more narrowly within a range from about 10 nm to about 50 nm, and more narrowly within a range from about 25 nm to about 50 nm. In many examples, the upper surface of the primary electrochromic layer has a surface roughness within a range from about 15 nm to about 45 nm, more narrowly within a range from about 25 nm to about 45 nm, such as about 35 nm.

In another embodiment, a method for fabricating an electrochromic device includes forming a lower transparent conductor layer on a substrate and forming a primary electrochromic layer on the upper surface of the lower transparent conductor layer, wherein the upper surface of the primary electrochromic layer has a surface roughness that is less than the surface roughness of the upper surface of the lower transparent conductor layer. Generally, the upper surface of the primary electrochromic layer has a surface roughness of about 50 nm or less although the underlying lower transparent conductor layer has an upper surface with a surface roughness of greater than 50 nm. The method further provides forming an ion conductor layer on the upper surface of the primary electrochromic layer, forming a secondary electrochromic layer on an upper surface of the ion conductor layer, forming an upper transparent conductor layer on an upper surface of the secondary electrochromic layer, and forming an antireflection layer on an upper surface of the upper transparent conductor layer.

The lower transparent conductor layer generally contains a material selected from tin oxide, fluoride-doped tin oxide, indium tin oxide, aluminum zinc oxide, doped variants thereof, derivatives thereof, or combinations thereof. The lower transparent conductor layer generally is deposited or otherwise formed by a process selected from spray pyrolysis, solution-based coating, sputtering, evaporation, physical vapor deposition (PVD), or CVD. The lower transparent conductor layer generally has a thickness within a range from about 50 nm to about 1,000 nm, more narrowly within a range from about 100 nm to about 700 nm, more narrowly within a range from about 200 nm to about 600 nm, and more narrowly within a range from about 300 nm to about 400 nm.

The primary electrochromic layer generally contains tungsten oxide and may be formed on the upper surface of the lower transparent conductor layer by a deposition process such as dip coating, spin coating, electrophoresis, inkjet printing, roll coating, spray coating, meniscus coating, curtain coating, and/or variations thereof. In many examples, the primary electrochromic layer contains tungsten oxide, doped variants thereof, or derivatives thereof and may be formed by a sol-gel technique or a solution-based technique. The primary electrochromic layer generally has a thickness within a range from about 25 nm to about 1,000 nm, more narrowly within a range from about 50 nm to about 800 nm, and more narrowly within a range from about 100 nm to about 600 nm.

The ion conductor layer generally contains a material selected from lithium titanium phosphate, lithium lanthanum titanium phosphate, lithium lanthanum titanate, doped variants thereof, derivatives thereof, or combinations thereof. The ion conductor layer is applied or otherwise formed by a sol-gel technique or a solution-based technique. The ion conductor layer is formed on the upper surface of the primary electrochromic layer by a deposition process such as dip coating, spin coating, electrophoresis, inkjet printing, roll coating, spray coating, meniscus coating, curtain coating, and/or variations thereof. In some examples, the substrate is generally maintained at a temperature within a range from about 23° C. to about 700° C. during the deposition process. The upper surface of the ion conductor layer has a surface roughness of about 50 nm or less, such as within a range from about 1 nm to about 50 nm, more narrowly within a range from about 10 nm to about 50 nm, and more narrowly within a range from about 25 nm to about 50 nm. The ion conductor layer generally has a thickness within a range from about 1 nm to about 500 nm, more narrowly within a range from about 1 nm to about 300 nm, and more narrowly within a range from about 5 nm to about 200 nm.

The secondary electrochromic layer generally contains a material selected from nickel oxide, lithium nickel oxide, tungsten nickel oxide, lithium tungsten nickel oxide, doped variants thereof, derivatives thereof, or combinations thereof. The secondary electrochromic layer may be formed on the upper surface of the ion conductor layer by a deposition process such as dip coating, spin coating, electrophoresis, inkjet printing, roll coating, spray coating, meniscus coating, curtain coating, and/or variations thereof. In many examples, the secondary electrochromic layer is applied or otherwise formed by a sol-gel technique or a solution-based technique. The upper surface of secondary electrochromic layer has a surface roughness of about 50 nm or less, such as within a range from about 1 nm to about 50 nm, more narrowly within a range from about 10 nm to about 50 nm, and more narrowly within a range from about 25 nm to about 50 nm. The secondary electrochromic layer generally has a thickness within a range from about 10 nm to about 1,000 nm, more narrowly within a range from about 20 nm to about 400 nm, and more narrowly within a range from about 30 nm to about 300 nm.

The upper transparent conductor layer generally contains a material selected from indium oxide, indium tin oxide, indium titanium oxide, indium tungsten oxide, indium zirconium oxide, indium zirconium tin oxide, indium zirconium titanium oxide, indium zirconium tungsten oxide, indium hydrogen oxide, indium zirconium hydrogen oxide, aluminum zinc oxide, doped variants thereof, derivatives thereof, or combinations thereof. The upper transparent conductor layer may be formed on the upper surface of the secondary electrochromic layer by a deposition process such as dip coating, spin coating, electrophoresis, inkjet printing, roll coating, spray coating, meniscus coating, curtain coating, and/or variations thereof. In many examples, the upper transparent conductor layer is applied or otherwise formed by a sol-gel technique or a solution-based technique. The upper surface of the upper transparent conductor layer has a surface roughness of about 50 nm or less, such as within a range from about 1 nm to about 50 nm, more narrowly within a range from about 10 nm to about 50 nm, and more narrowly within a range from about 25 nm to about 50 nm. The upper transparent conductor layer generally has a thickness within a range from about 50 nm to about 1,000 nm, more narrowly within a range from about 100 nm to about 600 nm, and more narrowly within a range from about 100 nm to about 500 nm. The substrate containing the upper transparent conductor layer is heated to at a temperature within a range from about 200° C. to about 700° C., more narrowly within a range from about 300° C. to about 600° C., and more narrowly within a range from about 500° C. to about 600° C., during a curing process. The curing process generally includes exposing the upper transparent conductor layer to an infrared curing process, an ultraviolet curing process, a thermal plasma curing process, a non-thermal plasma curing process, a microwave curing process, or combinations thereof.

The antireflection layer has properties for reducing or eliminating light reflection, as well as for protecting the stacked layers within the electrochromic device. The antireflection layer prohibits or greatly reduces the amount of contaminants or undesirable agents (e.g., water or oxygen) that may penetrate into the other electrochromic layers. The antireflection layer generally contains a material selected from silicon oxide, silicate, aluminum oxide, aluminate, doped variants thereof, derivatives thereof, or combinations thereof. The antireflection layer is generally formed by a sol-gel technique or a solution-based technique. In some examples, the antireflection layer is formed on the upper surface of the upper transparent conductor layer by a deposition process such as dip coating, spin coating, electrophoresis, inkjet printing, roll coating, spray coating, meniscus coating, curtain coating, and/or variations thereof. The upper surface of the antireflection layer has a surface roughness of about 50 nm or less, such as within a range from about 1 nm to about 50 nm, more narrowly within a range from about 10 nm to about 50 nm, and more narrowly within a range from about 25 nm to about 50 nm. The antireflection layer generally has a thickness within a range from about 5 nm to about 1,000 nm, more narrowly within a range from about 100 nm to about 600 nm, and more narrowly within a range from about 200 nm to about 400 nm.

In another embodiment, an electrochromic device contains a lower transparent conductor layer disposed on a substrate, wherein an upper surface of the lower transparent conductor layer generally has a surface roughness of greater than 50 nm, a primary electrochromic layer containing tungsten oxide disposed on the upper surface of the lower transparent conductor layer, wherein an upper surface of the primary electrochromic layer may have a surface roughness of about 50 nm or less, an ion conductor layer disposed on the upper surface of the primary electrochromic layer, a secondary electrochromic layer disposed on an upper surface of the ion conductor layer, an upper transparent conductor layer disposed on an upper surface of the secondary electrochromic layer, and an antireflection layer disposed on an upper surface of the upper transparent conductor layer.

In another embodiment, an electrochromic device contains a lower transparent conductor layer disposed on a substrate, wherein an upper surface of the lower transparent conductor layer generally has a surface roughness of greater than 50 nm, a secondary electrochromic layer disposed on the upper surface of the lower transparent conductor layer, wherein an upper surface of the secondary electrochromic layer may have a surface roughness of about 50 nm or less, an ion conductor layer disposed on the upper surface of the secondary electrochromic layer, a primary electrochromic layer disposed on an upper surface of the ion conductor layer, an upper transparent conductor layer disposed on an upper surface of the primary electrochromic layer, and an antireflection layer disposed on an upper surface of the upper transparent conductor layer.

In another embodiment, a method for forming an ion conductor containing lithium lanthanum titanate for an electrochromic device includes preparing a peroxotitanate complex solution by combining at least metallic titanium, hydrogen peroxide solution, and ammonium hydroxide solution, and then preparing a lithium lanthanum titanate deposition solution by combining the peroxotitanate complex solution, a lithium source, and a lanthanum source. The method further includes applying the lithium lanthanum titanate deposition solution to form a lithium lanthanum titanate film on an electrochromic layer disposed over a substrate, and then curing the lithium lanthanum titanate film to form an ion conductor layer containing a lithium lanthanum titanate material on the electrochromic layer during a curing process.

In some examples, the peroxotitanate complex solution contains an ammonium peroxotitanate complex. In other examples, the method further includes combining at least one chelator with the metallic titanium, the hydrogen peroxide solution, and the ammonium hydroxide solution while preparing the peroxotitanate complex solution. In one example, the chelator is citric acid and the peroxotitanate complex solution contains a citratoperoxotitanate complex. In some examples, the lithium lanthanum titanate deposition solution contains a Li:La:Ti molar ratio of about 1:1:2. In many examples, the lithium source contains lithium nitrate and independently, the lanthanum source contains lanthanum nitrate. The lithium lanthanum titanate film may be formed on the electrochromic layer by a deposition process such as dip coating, spin coating, electrophoresis, inkjet printing, roll coating, spray coating, meniscus coating, curtain coating, and/or variations thereof. An upper surface of the ion conductor layer may have a surface roughness of about 50 nm or less and an upper surface of the electrochromic layer generally has a surface roughness of greater than 50 nm.

Embodiments of the invention generally provide electrochromic devices and materials and processes for forming such electrochromic devices and materials. Embodiments provide an electrochromic multilayer structure that contains one or more or all planarizing layers and a process for depositing or otherwise forming such planarizing layers.

A planarizing layer, as used herein, may be a layer, film, or material that has an upper surface with a surface roughness less than the surface roughness of the upper surface of an underlying layer, film, or material which the film is deposited, applied, formed, or otherwise disposed on or over. In many examples, a planarizing layer is a layer, film, or material that has an upper surface with a surface roughness of about one half or less of the surface roughness of the upper surface of the underlying layer, film, or material. Surface roughness can be quantified by one of the standard parameters for surface roughness, including $R_a$ which is the arithmetic average of the absolute values of the peak-to-valley heights, and $R_{rms}$ which is the square root of the mean of the squares of the peak-to-valley heights.

The planarizing layers may be deposited or otherwise formed via dip coating, spin coating, electrophoresis, inkjet printing, roll coating, spray coating, meniscus coating, or curtain coating using sol-gel or solution-based precursors onto a substrate held at a temperature from about 23° C. (ambience or room temperature) to about 700° C. The deposited wet films then are subjected to curing and heat treatment. The other non-planarizing layers may be deposited by a deposition technique such as spray pyrolysis, sputtering, evaporation, PVD, or chemical vapor deposition (CVD).

In one embodiment described herein, FIG. 1A depicts an electrochromic device 100a that contains a lower transparent conductor (TC) layer 110 disposed on a substrate 102, wherein an upper surface 112 of the lower transparent conductor layer 110 has a surface roughness of greater than 50 nm and a PEC layer 120 having planarizing properties is disposed on the upper surface 112 of the lower transparent conductor layer 110. The upper surface 122 of the primary electrochromic layer 120 has a surface roughness that is less than the surface roughness of upper surface 112 of the lower transparent conductor layer 110, such as about 50 nm or less. The electrochromic device 100a further contains an ion conductor (IC) layer 130 disposed on the upper surface 122 of the primary electrochromic layer 120, a secondary electrochromic (SEC) layer 140 disposed on an upper surface 132 of the ion conductor layer 130, an upper transparent conductor (TC) layer 150 disposed on an upper surface 142 of the secondary electrochromic layer 140, and an antireflection (AR) layer 160 disposed on an upper surface 152 of the upper transparent conductor layer 150.

In some embodiments, each of the primary electrochromic layer 120, the ion conductor layer 130, the secondary electrochromic layer 140, the upper transparent conductor layer 150, and/or the antireflection layer 160 may independently have a surface roughness that is equal to or less than the surface roughness of the adjacent and underlying layer disposed underneath. In another embodiment, the primary electrochromic layer 120, the ion conductor layer 130, the secondary electrochromic layer 140, the upper transparent conductor layer 150, and the antireflection layer 160 are planarizing layers. Each sequentially deposited planarizing layer within the stack of electrochromic device 100a or 100b has a surface roughness that is significantly and progressively less than the surface roughness of each immediate underlying planarizing layer. The resulting upper surface of final stack (e.g., the upper surface 162 of the antireflection layer 160) has less surface roughness (or is smoother) than the upper surface 112 of the lower transparent conductor layer 110.

In some examples, the surface roughness of the upper surface 122 of the primary electrochromic layer 120 is significantly less than the surface roughness of the upper surface 112 of the lower transparent conductor layer 110, such as by more than a factor of two of the average peak-to-valley heights (e.g., $R_a$ of the upper surface 122 of the primary electrochromic layer 120 is less than one half of the $R_a$ of the upper surface 112 of the lower transparent conductor layer 110). The upper surface 112 of the lower transparent conductor layer 110 contains protrusions or irregularities which extend at sharp and jagged angles, while the primary electrochromic layer 120—a planarizing layer—has less extended, rounded protrusions or irregularities on the upper surface 122. The upper surfaces of the subsequently deposited non-planarizing layers, however, have similar or slightly reduced surface roughness compared to the $R_a$ of the upper surface 122 of the primary electrochromic layer 120.

Figure 1B:
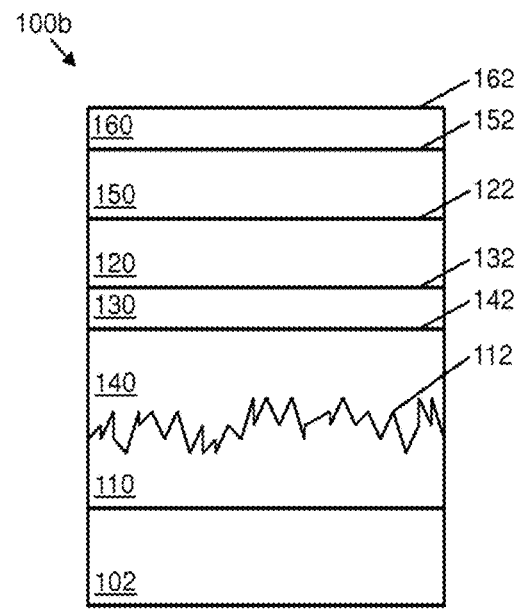

In another embodiment described herein, FIG. 1B depicts an electrochromic device 100b that contains the lower transparent conductor layer 110 disposed on the substrate 102, wherein the upper surface 112 of the lower transparent conductor layer 110 has a surface roughness of greater than 50 nm and the secondary electrochromic layer 140 having planarizing properties is disposed on the upper surface 112 of the lower transparent conductor layer 110. The upper surface 142 of the secondary electrochromic layer 140 has a surface roughness that is less than a surface roughness of upper surface 112 of the lower transparent conductor layer 110, such as about 50 nm or less. The electrochromic device 100b further contains the ion conductor layer 130 disposed on the upper surface 142 of the secondary electrochromic layer 140, the primary electrochromic layer 120 disposed on the upper surface 132 of the ion conductor layer 130, the upper transparent conductor layer 150 disposed on the upper surface 122 of the primary electrochromic layer 120, and the antireflection layer 160 disposed on the upper surface 152 of the upper transparent conductor layer 150.

Similarly, in some examples, the surface roughness of the upper surface 142 of the secondary electrochromic layer 140 is significantly less than the surface roughness of the upper surface 112 of the lower transparent conductor layer 110, such as by more than a factor of two of the average peak-to-valley heights (e.g., $R_a$ of the upper surface 142 of the secondary electrochromic layer 140 is less than one half of the $R_a$ of the upper surface 112 of the lower transparent conductor layer 110). The upper surface 112 of the lower transparent conductor layer 110 contains protrusions or irregularities which extend at sharp and jagged angles, while the secondary electrochromic layer 140—a planarizing layer—has less extended, rounded protrusions or irregularities on the upper surface 142. The upper surfaces of the subsequently deposited non-planarizing layers, however, have similar or slightly reduced surface roughness compared to the $R_a$ of the upper surface 142 of the secondary electrochromic layer 140.

In another embodiment, a method for fabricating an electrochromic device, such as electrochromic device 100a, includes forming the lower transparent conductor layer 110 on the substrate 102 and forming the primary electrochromic layer 120 on the upper surface 112 of the lower transparent conductor layer 110, wherein the upper surface 122 of the primary electrochromic layer 120 has a surface roughness that is less than a surface roughness of the upper surface 112 of the lower transparent conductor layer 110. Generally, the upper surface 122 of the primary electrochromic layer 120 has a surface roughness of about 50 nm or less although the underlying lower transparent conductor layer 110 has the upper surface 112 with a surface roughness of greater than 50 nm. The method further provides forming the ion conductor layer 130 on the upper surface 122 of the primary electrochromic layer 120, forming the secondary electrochromic layer 140 on the upper surface 132 of the ion conductor layer 130, forming the upper transparent conductor layer 150 on the upper surface 142 of the secondary electrochromic layer 140, and forming the antireflection layer 160 on the upper surface 152 of the upper transparent conductor layer 150.

In some examples, the method includes depositing or otherwise forming a lower transparent conductor layer 110 on the substrate 102, wherein an upper surface 112 of the lower transparent conductor layer 110 generally has a surface roughness of greater than 50 nm. In other examples, the method includes providing a substrate 102 containing a lower transparent conductor layer 110 disposed thereon, such as a prefabricated substrate, wherein an upper surface of the lower transparent conductor layer generally has a surface roughness of greater than 50 nm. The substrate 102 generally contains at least one material selected from glass, quartz, crystalline, silicon, silicon oxide, silicon dioxide, gallium arsenide, plastic, polymeric, derivatives thereof, doped variations thereof, or combinations thereof.

The lower transparent conductor layer 110 generally contains a material selected from tin oxide, fluoride-doped tin oxide, indium tin oxide, aluminum zinc oxide, doped variants thereof, derivatives thereof, or combinations thereof. The lower transparent conductor layer 110 generally is deposited or otherwise formed by a process selected from spray pyrolysis, solution-based coating, sputtering, evaporation, PVD, or CVD. The upper surface 112 of the lower transparent conductor layer 110 generally has a surface roughness of greater than 50 nm, such as within a range from greater than 50 nm to about 300 nm, more narrowly within a range from greater than 50 nm to about 200 nm, and more narrowly within a range from greater than 50 nm to about 100 nm. In many examples, the upper surface 112 of the lower transparent conductor layer 110 has a surface roughness within a range from about 60 nm to about 100 nm, more narrowly within a range from about 70 nm to about 80 nm, such as about 75 nm. The lower transparent conductor layer 110 generally has a thickness within a range from about 50 nm to about 1,000 nm, more narrowly within a range from about 100 nm to about 700 nm, more narrowly within a range from about 200 nm to about 600 nm, and more narrowly within a range from about 300 nm to about 400 nm.

The primary electrochromic layer 120 generally contains tungsten oxide and may be deposited or otherwise formed on the upper surface 112 of the lower transparent conductor layer 110 or on the upper surface 132 of the ion conductor layer 130. The primary electrochromic layer 120 may be formed by a deposition process such as dip coating, spin coating, electrophoresis, inkjet printing, roll coating, spray coating, meniscus coating, curtain coating, and/or variations thereof. In many examples, the primary electrochromic layer 120 contains tungsten oxide, doped variants thereof, or derivatives thereof and may be formed by a sol-gel technique or a solution-based technique. The upper surface 122 of the primary electrochromic layer 120 generally has a surface roughness of about 50 nm or less, such as within a range from about 1 nm to about 50 nm, more narrowly within a range from about 10 nm to about 50 nm, and more narrowly within a range from about 25 nm to about 50 nm. In many examples, the upper surface 122 of the primary electrochromic layer 120 has a surface roughness within a range from about 15 nm to about 45 nm, more narrowly within a range from about 25 nm to about 45 nm, such as about 35 nm. The primary electrochromic layer 120 generally has a thickness within a range from about 25 nm to about 1,000 nm, more narrowly within a range from about 50 nm to about 800 nm, and more narrowly within a range from about 100 nm to about 600 nm.

The ion conductor layer 130 generally contains a material selected from lithium titanium phosphate, lithium lanthanum titanium phosphate, lithium lanthanum titanate, doped variants thereof, derivatives thereof, or combinations thereof. The ion conductor layer 130 is applied, deposited, or otherwise formed by a sol-gel technique or a solution-based technique. The ion conductor layer 130 may be formed on the upper surface 122 of the primary electrochromic layer 120 or formed on the upper surface 142 of the secondary electrochromic layer 140. The ion conductor layer 130 is formed by a deposition process such as dip coating, spin coating, electrophoresis, inkjet printing, roll coating, spray coating, meniscus coating, curtain coating, and/or variations thereof. In some examples, the substrate is generally maintained at a temperature within a range from about 23° C. to about 700° C. during the deposition process. The upper surface 132 of the ion conductor layer 130 has a surface roughness of about 50 nm or less, such as within a range from about 1 nm to about 50 nm, more narrowly within a range from about 10 nm to about 50 nm, and more narrowly within a range from about 25 nm to about 50 nm. In many examples, upper surface 132 of the ion conductor layer 130 has a surface roughness within a range from about 15 nm to about 45 nm, more narrowly within a range from about 25 nm to about 45 nm, such as about 35 nm. The ion conductor layer 130 generally has a thickness within a range from about 1 nm to about 500 nm, more narrowly within a range from about 1 nm to about 300 nm, and more narrowly within a range from about 5 nm to about 200 nm.

The secondary electrochromic layer 140 generally contains a material selected from nickel oxide, lithium nickel oxide, tungsten nickel oxide, lithium tungsten nickel oxide, doped variants thereof, derivatives thereof, or combinations thereof. The secondary electrochromic layer 140 may be formed on the upper surface 132 of the ion conductor layer 130 or formed on the upper surface 112 of the lower transparent conductor layer 110. The secondary electrochromic layer 140 is formed by a deposition process such as dip coating, spin coating, electrophoresis, inkjet printing, roll coating, spray coating, meniscus coating, curtain coating, and/or variations thereof. In many examples, the secondary electrochromic layer 140 is applied or otherwise formed by a sol-gel technique or a solution-based technique. The upper surface 142 of secondary electrochromic layer 140 has a surface roughness of about 50 nm or less, such as within a range from about 1 nm to about 50 nm, more narrowly within a range from about 10 nm to about 50 nm, and more narrowly within a range from about 25 nm to about 50 nm. In many examples, upper surface 142 of secondary electrochromic layer 140 has a surface roughness within a range from about 15 nm to about 45 nm, more narrowly within a range from about 25 nm to about 45 nm, such as about 35 nm. The secondary electrochromic layer 140 generally has a thickness within a range from about 10 nm to about 1,000 nm, more narrowly within a range from about 20 nm to about 400 nm, and more narrowly within a range from about 30 nm to about 300 nm.

The upper transparent conductor layer 150 generally contains a material selected from indium oxide, indium tin oxide, indium titanium oxide, indium tungsten oxide, indium zirconium oxide, indium zirconium tin oxide, indium zirconium titanium oxide, indium zirconium tungsten oxide, indium hydrogen oxide, indium zirconium hydrogen oxide, aluminum zinc oxide, doped variants thereof, derivatives thereof, or combinations thereof. The upper transparent conductor layer 150 may be deposited or otherwise formed on the upper surface 142 of the secondary electrochromic layer 140 or formed on the upper surface 122 of the primary electrochromic layer 120. The upper transparent conductor layer 150 may be formed by a deposition process such as dip coating, spin coating, electrophoresis, inkjet printing, roll coating, spray coating, meniscus coating, curtain coating, and/or variations thereof. In many examples, the upper transparent conductor layer 150 is applied or otherwise formed by a sol-gel technique or a solution-based technique. The upper surface 152 of the upper transparent conductor layer 150 has a surface roughness of about 50 nm or less, such as within a range from about 1 nm to about 50 nm, more narrowly within a range from about 10 nm to about 50 nm, and more narrowly within a range from about 25 nm to about 50 nm. In many examples, upper surface 152 of the upper transparent conductor layer 150 has a surface roughness within a range from about 15 nm to about 45 nm, more narrowly within a range from about 25 nm to about 45 nm, such as about 35 nm. The upper transparent conductor layer 150 generally has a thickness within a range from about 50 nm to about 1,000 nm, more narrowly within a range from about 100 nm to about 600 nm, and more narrowly within a range from about 100 nm to about 500 nm.

In some examples, the substrate 102 containing the upper transparent conductor layer 150 disposed within or on the electrochromic device 100a or 100b is heated to at a temperature within a range from about 200° C. to about 700° C., more narrowly within a range from about 300° C. to about 600° C., and more narrowly within a range from about 500° C. to about 600° C., during a curing process. The curing process generally includes exposing the upper transparent conductor layer 150 to an infrared curing process, an ultraviolet curing process, a thermal plasma curing process, a non-thermal plasma curing process, a microwave curing process, or combinations thereof.

The antireflection layer 160 has properties for reducing or eliminating light reflection and/or for protecting the stacked layers within the electrochromic device 100a or 100b. The antireflection layer 160 prohibits, inhibits, or greatly reduces the amount of contaminants or undesirable agents (e.g., water, oxygen, and/or nitrogen) that may penetrate into the other electrochromic layers. The antireflection layer 160 generally contains a material selected from silicon oxide, silicate, aluminum oxide, aluminate, doped variants thereof, derivatives thereof, or combinations thereof. The antireflection layer 160 is generally formed by a sol-gel technique, a solution-based technique, or a spray pyrolysis technique. In some examples, the antireflection layer 160 is usually formed on the upper surface 152 of the upper transparent conductor layer 150 by a deposition process such as dip coating, spin coating, electrophoresis, inkjet printing, roll coating, spray coating, meniscus coating, curtain coating, and/or variations thereof. The upper surface 162 of the antireflection layer 160 has a surface roughness of about 50 nm or less, such as within a range from about 1 nm to about 50 nm, more narrowly within a range from about 10 nm to about 50 nm, and more narrowly within a range from about 25 nm to about 50 nm. In many examples, the upper surface 162 of the antireflection layer 160 has a surface roughness within a range from about 15 nm to about 45 nm, more narrowly within a range from about 25 nm to about 45 nm, such as about 35 nm. The antireflection layer 160 generally has a thickness within a range from about 5 nm to about 1,000 nm, more narrowly within a range from about 100 nm to about 600 nm, and more narrowly within a range from about 200 nm to about 400 nm.

In another embodiment, an electrochromic device contains a lower transparent conductor layer disposed on a substrate, wherein an upper surface of the lower transparent conductor layer generally has a surface roughness of greater than 50 nm, a primary electrochromic layer containing tungsten oxide disposed on the upper surface of the lower transparent conductor layer, wherein an upper surface of the primary electrochromic layer may have a surface roughness of about 50 nm or less, an ion conductor layer disposed on the upper surface of the primary electrochromic layer, a secondary electrochromic layer disposed on an upper surface of the ion conductor layer, an upper transparent conductor layer disposed on an upper surface of the secondary electrochromic layer, and an antireflection layer disposed on an upper surface of the upper transparent conductor layer.

Example A

An electrochromic multilayer stack TC/PEC/IC/SEC/TC/AR (optional) (or the reverse TC/SEC/IC/PEC/TC/AR (optional)) may be deposited via a technique such as sputtering, evaporation, or CVD which are non-planarizing techniques. In some examples, a commercial fluorine-doped tin oxide (FTO) coating on glass may be used as the bottom TC. Such commercial FTO is usually polycrystalline and rough, with large grain sizes, in order to have a low resistivity. The average peak-to-valley height for a layer or film of thickness within a range from about 300 nm to about 4,000 nm is between $R_a$ is within a range from about 50 nm to about 100 nm.

In one embodiment, the PEC layer can be a planarizing layer, although one or more or all of the other layers can also be planarizing layers. Specifically, the PEC layer may contain or be composed of tungsten oxide (e.g., $WO_3$) which can be prepared by a sol-gel technique. The sol solution is formed by dissolving tungsten ethoxide (99.99%) into ethanol (99.5%) with a ratio of about 1 g of tungsten ethoxide to about 500 ml ethanol and condensed to about 3 wt % tungsten oxide. The solution is then deposited onto a substrate to form a final oxide film of thickness between about 50 nm to about 800 nm via dip coating, spin coating, electrophoresis, inkjet printing, roll coating, spray coating, meniscus coating, or curtain coating. The coating is dried at room temperature and then heat treated to about 300° C. for about 2 hours. The surface roughness of resulting the PEC layer containing tungsten oxide is a significantly less (smoother) than the surface roughness of the underlying rough FTO surface, as the tungsten oxide material is deposited more in the valleys and less on the peaks of the FTO surface. The sharp angles in the FTO surface also are rounded out on the tungsten oxide surface. The average peak-to-valley height Ra of the tungsten oxide may be within a range from about 5 nm to about 50 nm. The subsequent non-planarizing layers are conformal to the tungsten oxide surface, with the resulting stack having lower haze, and fewer pinholes and electrical shorts.

Example B

An electrochromic multilayer stack contains all planarizing layers, except for the rough bottom FTO layer. As an example, each of the planarizing layers can be prepared by a sol-gel technique as follows:

The PEC may contain of tungsten oxide which can be deposited using the same sol-gel technique as in Example A.

The IC layer may contain of inorganic lithium titanium phosphate can be deposited using the sol-gel techniques described herein.

The SEC layer may contain of nickel oxide which can be deposited as follows:

An alcoholic sol-gel precursor is prepared from nickel acetate ($NiC_4H_6O_4 \cdot 4H_2O$, Aldrich) and lithium acetate ($LiC_4H_6O_4 \cdot 4H_2O$, Aldrich) precursors. Nickel acetate and lithium acetate are mixed at molar ratios Ni/Li of 2, 1, and 0.5 with a slow addition of an aqueous solution (about 30 vol %) of $H_2O_2$ (Fluka). The high exothermic reaction is controlled by cooling the mixture with tap water. After the reaction is completed and additional $H_2O_2$ is added, the resulting solution is freeze-dried in vacuum. The freeze-dried residues are then dissolved in about 100 mL of ethanol (95%). The green Li/Ni-sol is deposited onto a substrate via dip coating, spin coating, electrophoresis, inkjet printing, roll coating, spray coating, meniscus coating, or curtain coating. The planarizing film is then cured and heat treated at a substrate temperature between about 330° C. to about 400° C. using infrared, ultraviolet, thermal (or non-thermal) plasma, or microwave heating.

The upper TC layer may contain of indium tin oxide (ITO) which can be deposited as follows: Indium acetate of a molar ratio 90% and tin chloride of 10% are dissolved in 2-methoxyethanol. After adding ethylenediamine as a chelating agent, the solution is stirred at room temperature for about 2 hours to become transparent and homogeneous, and then filtered through a 0.22 um syringe filter. The solution is deposited onto a substrate via dip coating, spin coating, electrophoresis, inkjet printing, roll coating, spray coating, meniscus coating, or curtain coating. The planarizing film is then cured and heat treated at a substrate temperature between about 500° C. to about 600° C. using infrared, ultraviolet, thermal (or non-thermal) plasma, or microwave heating.

Optionally, a planarizing transparent AR layer can be coated on top of the stack as a barrier against oxygen and moisture while also acting as an antireflection coating. The planarizing transparent AR layer may contain silicon oxide, aluminum oxide, derivatives thereof, or combinations thereof, and may be deposited via a sol-gel technique.

In some embodiments, two or more planarizing layers (e.g., the primary electrochromic layer 120, the ion conductor layer 130, the secondary electrochromic layer 140, the upper transparent conductor layer 150, and/or the antireflection layer 160) are deposited adjacent to each other, the respective sol-gel precursors are selected such that the precursors do not degrade the layer or layers below. Furthermore, before the deposition of the next layer, each planarizing layer is subjected to curing and heat treatment to increase its durability and resistance to the later precursors.

In some examples for forming an electrochromic multilayer stack, a substrate temperature of greater than 200° C. may be obtained during a thermal process to heat-treat the planarizing layers deposited from solution-based or sol-gel precursors. In another embodiment, a plasma process may be utilized to treat the planarizing layers. Atmospheric (or vacuum-based) cold or thermal plasma, or atmospheric (or vacuum-based) hot or thermal plasma may be formed from one or more process gases such as oxygen, hydrogen, argon, water, nitrogen, helium, or mixtures thereof. Such plasmas may be utilized during heat treatments at reduced substrate temperatures, to help remove solvents and organic additives, and to help with calcining and/or sintering.

An Alternative Embodiment

In an alternative embodiment described herein, inorganic solid-state ion conductor materials are provided and have the following desirable properties: i) high ionic conductivity and low electronic conductivity, ii) low process temperature, and iii) planarizing materials. In some embodiments, a method for forming an ion conductor containing lithium lanthanum titanate (LLTO) for an electrochromic device includes preparing a peroxotitanate complex solution by combining at least metallic titanium, hydrogen peroxide solution, and ammonium hydroxide solution, and then preparing a lithium lanthanum titanate deposition solution by combining the peroxotitanate complex solution, a lithium source, and a lanthanum source. The method further includes applying the lithium lanthanum titanate deposition solution to form a lithium lanthanum titanate film on an electrochromic layer disposed over a substrate, and then curing the lithium lanthanum titanate film to form an ion conductor layer containing a lithium lanthanum titanate material on the electrochromic layer during a curing process.

In some embodiments described herein, electrochromic devices, such as electrochromic device 100a or 100b, may be fabricated having an ion conductor layer, such as ion conductor layer 130, containing a lithium lanthanum titanate material. The lithium lanthanum titanate materials and LLTO-based ion conductor materials, and low substrate temperature sol-gel techniques to fabricate them as planarizing thin films (as well as powder and bulk).

Bulk conductivity of crystalline perovskite lithium lanthanum titanate $Li_{3x}La_{2/3-x}TiO_3$ (LLTO, wherein x=0 to ⅔ with maximum conductivity around x is about 0.1) is among the highest for inorganic solid-state ion conductor materials. Amorphous LLTO and LLTO doped with Al and/or Si are proposed in this application as new ion conductor materials with high ionic conductivity and low electronic conductivity. These amorphous ion conductor materials may be deposited or otherwise formed as planarizing thin films at low substrate temperatures below 400° C. by sol-gel techniques. The ion conductor materials may also be fabricated as powder and monoliths via sol-gel techniques.

In some examples, the peroxotitanate complex solution contains an ammonium peroxotitanate complex. In other examples, the method further includes combining at least one chelator with the metallic titanium, the hydrogen peroxide solution, and the ammonium hydroxide solution while preparing the peroxotitanate complex solution. In one example, the chelator is citric acid and the peroxotitanate complex solution contains a citratoperoxotitanate complex. In some examples, the lithium lanthanum titanate deposition solution contains an approximate Li:La:Ti molar ratio of about 1:1:2. In many examples, the lithium source contains lithium nitrate and independently, the lanthanum source contains lanthanum nitrate. The lithium lanthanum titanate film may be formed on the electrochromic layer by a deposition process such as dip coating, spin coating, electrophoresis, inkjet printing, roll coating, spray coating, meniscus coating, curtain coating, and/or variations thereof. An upper surface of the ion conductor layer may have a surface roughness of about 50 nm or less and an upper surface of the electrochromic layer generally has a surface roughness of greater than 50 nm.

In some examples, the peroxotitanate complex solution may be prepared by combining the metallic titanium, the hydrogen peroxide solution, and the ammonium hydroxide solution in a mixture by volume of about 9:1:1. Generally, the hydrogen peroxide solution contains hydrogen peroxide by volume in water within a range from about 10% to about 50%, more narrowly within a range from about 20% to about 40%, and more narrowly within a range from about 28% to about 32% and the ammonium hydroxide solution contains ammonia in water by volume within a range from about 10% to about 50%, more narrowly within a range from about 20% to about 40%, and more narrowly within a range from about 28% to about 32%. In some examples, the hydrogen peroxide solution contains about 30% by volume of aqueous hydrogen peroxide and the ammonium hydroxide solution contains about 30% by volume of aqueous ammonia. The upper surface of the ion conductor layer containing the lithium lanthanum titanate material generally has a surface roughness of about 50 nm or less, such as within a range from about 1 nm to about 50 nm, more narrowly within a range from about 10 nm to about 50 nm, and more narrowly within a range from about 25 nm to about 50 nm. The ion conductor layer containing the lithium lanthanum titanate material generally has a thickness within a range from about 1 nm to about 500 nm, more narrowly within a range from about 1 nm to about 300 nm, and more narrowly within a range from about 5 nm to about 200 nm.

The substrate containing the applied lithium lanthanum titanate film on the electrochromic layer is heated to at a temperature within a range from about 100° C. to about 1,500° C. In one embodiment, the substrate is heated to at a temperature a range from about 100° C. to about 500° C., more narrowly within a range from about 200° C. to about 400° C., and more narrowly within a range from about 300° C. to about 350° C. during the curing process. In another embodiment, the substrate is heated to at a temperature a range from about 150° C. to about 1,500° C., more narrowly within a range from about 300° C. to about 1,200° C., and more narrowly within a range from about 500° C. to about 1,000° C. during the curing process. The curing process generally includes exposing the applied lithium lanthanum titanate film on the electrochromic layer to an infrared curing process, an ultraviolet curing process, a thermal plasma curing process, a non-thermal plasma curing process, a microwave curing process, or combinations thereof.

Example 1

Deposition of LLTO with a Peroxotitanate Precursor

An inorganic precursor containing a peroxotitanate complex mixed with Li and La nitrates can be prepared as follows. In one example, about 1 M (in Ti) stock of ammonium peroxotitanate is made by dissolving the requisite amount of Ti powder in a mixture of about 9:1:1 of hydrogen peroxide (about 30 vol %) and aqueous ammonia (about 30 vol %). Appropriate amounts of lithium nitrate (up to 0.05 M) and lanthanum nitrate (up to 0.05 M) are dissolved in ammonium citratoperoxotitanate stock diluted to about 0.1 M to provide a molar ratio of about 0.5:0.5:1.0, respectively for Li:La:Ti. The solution is deposited onto a substrate via dip coating, spin coating, electrophoresis, inkjet printing, roll coating, spray coating, meniscus coating, or curtain coating. The (planarizing) LLTO film is then cured and heat treated at a substrate temperature between about 100° C. to about 350° C. Alternatively, the LLTO film can be heat treated at a substrate temperature between about 150° C. to about 1,500° C. using infrared, ultraviolet, thermal or non-thermal plasma, or microwave heating.

Example 2

Deposition of LLTO with a Citratoperoxotitanate Precursor

About 1 M (in Ti) stock of ammonium peroxotitanate is made by dissolving the requisite amount of Ti powder in a mixture of about 4:1:1 of hydrogen peroxide (about 30 vol %) and aqueous ammonia (about 30 vol %). Citric acid (up to 2 M) is added at a citric acid/Ti molar ratio of about 2, to form the citratoperoxotitanate complex. Appropriate amounts of lithium nitrate (up to 0.05 M) and lanthanum nitrate (up to 0.05 M) are dissolved in ammonium citratoperoxotitanate stock diluted to 0.1M to provide a molar ratio of 0.5:0.5:1.0 respectively for Li:La:Ti. The solution is deposited onto a substrate via dip coating, spin coating, electrophoresis, inkjet printing, roll coating, spray coating, meniscus coating, or curtain coating. The (planarizing) LLTO film is then cured and heat treated at a substrate temperature between about 100° C. to about 350° C., such as between about 300° C. to about 350° C. to burn-out any remaining citrate. Alternatively, the LLTO film can be heat treated at a substrate temperature between about 150° C. to about 1,500° C. using infrared, ultraviolet, thermal or non-thermal plasma, or microwave heating.

Example 3

Deposition of LLTO Via a Diol-Citratoperoxotitanate Precursor

About 1 M (in Ti) stock of ammonium peroxotitanate is made by dissolving the requisite amount of Ti powder in a 4:1 mixture of hydrogen peroxide (about 30 vol %) and aqueous ammonia (about 30 vol %). Citric acid (up to 2 M) is added at a citric acid/Ti molar ratio of 2, to form the citratoperoxotitanate complex. Appropriate amounts of lithium nitrate (up to 0.05 M) and lanthanum nitrate (up to 0.05 M) are dissolved in a ammonium citratoperoxotitanate stock diluted to about 0.1 M to provide a molar ratio of about 0.5:0.5:1.0, respectively for Li:La:Ti. Ethylene glycol (about 1.6 M) is added to the solution to give an ethylene glycol/citric acid molar ratio of about 4. The (planarizing) LLTO film is then cured and heat treated at a substrate temperature between about 100° C. to about 350° C., such as between about 300° C. to about 350° C. to burn-out any remaining organic residues. Alternatively, the LLTO film can be heat treated at a substrate temperature between about 150° C. to about 1,500° C. using infrared, ultraviolet, thermal or non-thermal plasma, or microwave heating.

Several Alternative Embodiments

Alternative embodiments, including Embodiments A-D, are further disclosed below.

Alternative Embodiment A

Figure 2:
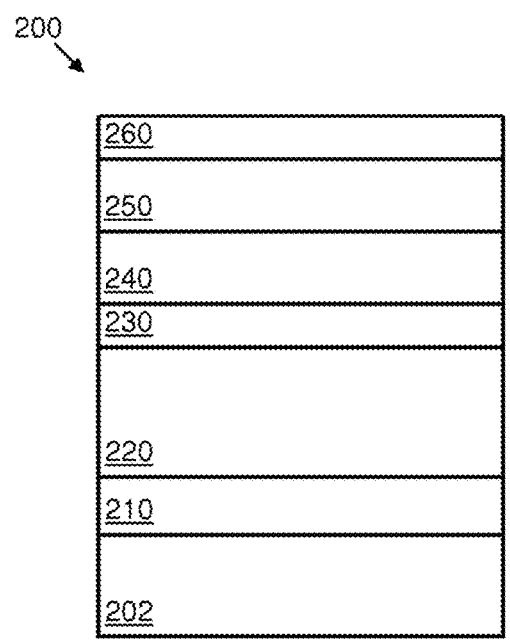
FIG. 2 depicts an electrochromic multilayer stack device, as described by another embodiment herein.

In one embodiment described herein, FIG. 2 depicts an electrochromic device 200, such as an electrochromic multilayer stack, that contains a lower transparent conductor (TC) layer 210 disposed on a substrate 202, and a primary electrochromic (PEC) layer 220 disposed on the upper surface of the lower transparent conductor layer 210. The electrochromic device 200 further contains an ion conductor (IC) layer 230 disposed on the upper surface of the primary electrochromic layer 220, a secondary electrochromic (SEC) layer 240 disposed on an upper surface of the ion conductor layer 230, an upper transparent conductor (TC) layer 250 disposed on an upper surface of the secondary electrochromic layer 240, and an antireflection (AR) layer 260 disposed on an upper surface of the upper transparent conductor layer 250.

In one example, illustrated in FIG. 2, a multilayer electrochromic structure may have of 5 or more layers positioned on a substrate with an optional top antireflection or protective layer, or positioned between two substrates in a laminate configuration. The substrates are normally transparent glass or plastic. The two outermost layers of the electrochromic multilayer structure are electrical transparent conductors, which conduct electrons across the window surface to charge and discharge the inner layers. Currently, transparent conducting oxides $SnO_2$:F and ITO are the most commonly used TC materials for electrochromic applications.

Adjacent to the inner side of either of the two TC layers is the PEC layer with sufficient electronic and ionic conductivities (e.g., a mixed conductor) so that its coloration/bleaching times are acceptably fast. Adjacent to the inner side of the other TC layer is the SEC layer which serves as an ion storage, ideally with electrochromic properties complementary to those of the PEC layer.

The IC layer, also referred to as the electrolyte layer, is disposed between the cathodic EC and anodic EC layers. The IC layer can be inorganic (e.g., an oxide such as $ZrO_2$ or Li—P—O—N) or organic (e.g., an adhesive polymer). Ideally, the IC layer should have high ionic conductivity but low electronic conductivity, such that it electronically insulates the cathodic and anodic layers from each other while letting ions pass through. The ions involved should be small enough to be highly mobile, such as protons ($H^+$) or lithium ions ($Li^+$). When the electronic leakage current is too high (due to intrinsic or extrinsic defects), it becomes difficult, especially in a large-area electrochromic window applications, to maintain local electric fields that are high enough to move the ions to charge/discharge the electrochromic layers. The operation of the 5-layer electrochromic structure above is similar to that of a rechargeable battery which changes color upon charging/discharging.

In one embodiment described herein, a small amount of water, between about 0.1 wt % to about 30 wt %, is included in a lithium-ion-based device and enhances lithium ion mobility without undergoing a significant lithium-water reaction. Consequently, to control the amount of water incorporated, a small percentage (between about 1 wt % to about 30 wt %, such as, about 1 wt % to about 10 wt %, where wt % stands for weight percent) of "high-temperature" hygroscopic materials that retain water at high temperatures (e.g., >about 120° C.) be included within the IC layer. In some examples, the hygroscopic materials that retain water the temperature may be within a range from about 120° C. to about 600° C. The device fabrication process then includes a step that introduces water to be retained by the hygroscopic materials. The IC layer with the hydrated hygroscopic high-temperature materials should have increased ionic conductivity, leading to faster switching and higher cycling durability. This Solution A.1 can also be applied to proton-based EC devices.

The IC layer may be deposited via techniques such as spray pyrolysis, sol-gel, sputtering, CVD, electroplating, thermal or electron beam evaporation, or other processes.

In another embodiment (Embodiment A.1) described herein, the IC layer generally contains an IC material such as tantalum oxides, such as tantalum pentoxide ($Ta_2O_5$), zirconium oxides, such as zirconium dioxide ($ZrO_2$), boron oxides, such as $B_2O$ or $B_2O_3$, lithium phosphorous oxynitride (Li—P—O—N), lithium silicate (Li—Si—O), lithium aluminate (Li—Al—O), lithium silialuminate (Li—Si—Al—O), alloys thereof, hydrates, thereof, derivatives thereof, or combinations thereof. In some examples, the IC layer may have high-temperature hygroscopic materials at a concentration within a range from about 1 wt % to about 30 wt %, more narrowly within a range from about 1 wt % to about 10 wt %. Exemplary high-temperature hygroscopic materials include boron oxide (which can remain hydrated up to about 300° C.) and zirconium oxide (which can remain hydrated up to about 550° C.). A step may be included in the material processing to hydrate the IC before sealing the device for operation. The IC material may be hydrated by adding moisture/water to the IC material or to the IC layer by exposure to water within the ambient air and/or directly with gaseous or liquid water added during or after the deposition step.

In another embodiment (Embodiment A.2) described herein, the one or more hygroscopic high-temperature materials are added to either the primary or secondary electrochromic layers, or both, to increase the ionic conductivity of these layers, leading to faster switching, higher cycling durability, and larger switching range (because the ions can penetrate deeper into primary and/or secondary electrochromic layers).

The layers may be deposited via techniques such as spray pyrolysis, sol-gel, sputtering, CVD, electroplating, thermal or electron beam evaporation, as well as other deposition processes.

In some aspects, boron oxide or zirconium oxide is doped into the primary and/or the secondary electrochromic layers (e.g., a concentration within a range from about 1 wt % to about 30 wt %, more narrowly within a range from about 1 wt % to about 10 wt %) to help retain a small amount of water, which would facilitate the lithium and other ions in moving inside and across these active layers.

In another embodiment (Embodiment A.3) described herein, an inorganic protective layer or a polymeric protective layer comprising of a hydrophobic material may be disposed over the TC of a multilayer electrochromic stack to maintain water from escaping the device. In some examples, the inorganic protective layer contains at least one hydrophobic material selected from zinc oxides, such as zinc dioxide ($ZnO_2$), titanium oxides, such as titanium dioxide ($TiO_2$), silicon oxides, such as silicon dioxide ($SiO_2$), derivatives thereof, dopant variants thereof, or combinations thereof.

In some examples, the hydrophobic layer may be simultaneously utilized as an antireflection layer, while in other examples, the hydrophobic layer may be utilized in conjunction with another antireflection layer disposed thereon. The hydrophobic layer may have a thickness within a range from about 30 nm to about 1 µm. The hydrophobic layer may be deposited via techniques such as spray pyrolysis, sol-gel, sputtering, CVD, electroplating, thermal or electron beam evaporation, as well as other deposition processes. Embodiment A.3 may be utilized for lithium-ion-based and/or proton-based devices.

In another embodiment (Embodiment A.4) described herein, a combination of two or more of the Embodiments A.1-A.3. In particular, a small percentage of high temperature hygroscopic materials could be added to the ion conductor layer and/or one or both of the primary and secondary electrochromic layers. Furthermore, an inorganic or polymeric protective material containing one or more hydrophobic materials can be put on the top TC of a multilayer electrochromic stack in conjunction with introduction of a small percentage of high temperature hygroscopic materials to one or more of the ion conductor layer, primary electrochromic layer, or the secondary electrochromic layer. In addition to application involving electrochromic devices, all the Embodiments A.1-A.3 discussed above can also be applied to lithium-ion-based and proton-based batteries, especially thin film batteries.

Alternative Embodiment B

In another embodiment (Embodiment B) described herein, the electrochromic material structures may have a large-grain thin film mixture of a first cathodic electrochrome (e.g., becoming more transparent upon ion intercalation) and a second cathodic electrochrome of similar refractive index in the bleached state and different refractive index in the colored state. In another embodiment, the electrochromic material structures may have a large-grain thin film mixture of a first cathodic electrochrome and an ion conductor material with a refractive index that is similar to that of the first cathodic electrochrome in the bleached state, but that is different from that of the first cathodic electrochrome in the colored state. Note that an ion conductor material generally does not switch or change its refractive index like an electrochrome.

Alternatively, the new material structures can include large-grains (on the order of about 20 nm to about 400 nm in grain width) thin film mixture of a first anodic electrochrome (e.g., becoming darker upon ion intercalation), and a second anodic electrochrome of similar refractive index in the bleached state and different refractive index in the colored state. In another embodiment, the ion conductor material may have a refractive index that is similar to that of the first anodic electrochrome in the bleached state, but that is different from that of the first anodic electrochrome in the colored state.

The cathodic electrochromic materials include tungsten oxides, such as tungsten trioxide ($WO_3$), molybdenum oxides, such as molybdenum trioxide ($MoO_3$), niobium oxides, such as niobium pentoxide ($Nb_2O_5$), derivatives thereof, or combinations thereof. The anodic electrochromic materials include niobium oxides, such as niobium oxide (e.g., NiO), iridium oxides, such as iridium dioxide ($IrO_2$), chromium oxides, such as chromium trioxide ($Cr_2O_3$), derivatives thereof, or combinations thereof. The ion conductor may contain a material such as tantalum oxides, such as tantalum pentoxide ($Ta_2O_5$), zirconium oxides, such as zirconium dioxide ($ZrO_2$), boron oxides, such as $B_2O$ or $B_2O_3$, lithium phosphorous oxynitride (Li—P—O—N), lithium silicate (Li—Si—O), lithium aluminate (Li—Al—O), lithium silialuminate (Li—Si—Al—O), alloys thereof, derivatives thereof, or combinations thereof. In other embodiments, the ion conductor may contain a polymers, oligomer. The large grains are created by spray pyrolysis, which is a most suitable method. In the bleached state, the grains all have similar refractive indices and hence haze is minimized. In the colored state, grains of different materials have different refractive indices, increasing the overall haze which is desirable in privacy window applications.

In another embodiment, a 5-layer electrochromic device TC/PEC/IC/SEC/TC (FIG. 3A) or alternatively TC/SEC/IC/PEC/TC (FIG. 3B) contains a PEC layer with a large-grain thin film mixture of about 20 nm to about 400 nm vanadium-tungsten oxide (V—$WO_3$) or titanium dioxide ($TiO_2$) grains embedded in a ~300-500 nm $WO_3$ thin film matrix. The approximate refractive indices are shown in Table 1, as follows:

TABLE 1

| | Refractive index @ 550 nm wavelength | |
|---|---|---|
| | Bleached | Colored |
| $TiO_2$ | 2.05 | 2.08 |
| V—$WO_3$ | 2.00 | 1.85 |
| $WO_3$ | 1.99 | 1.69 |

In the bleached state, the differences in refractive index between $TiO_2$ and V—$WO_3$ versus $WO_3$ are approximately 0.06 and 0.01 respectively, resulting in relatively low haze. In the colored state, the differences are 0.39 and 0.16 respectively, resulting in relatively high haze.

Figure 3A:
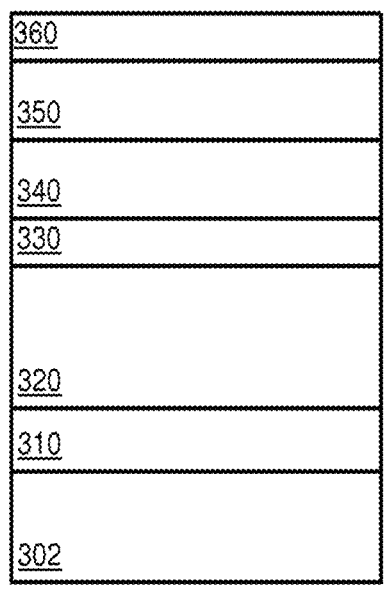
FIGS. 3A-3B depict electrochromic multilayer stack devices, as described by other embodiments herein.

In one embodiment described herein, FIG. 3A depicts an electrochromic device 300a, such as an electrochromic multilayer stack, that contains a lower transparent conductor (TC) layer 310 disposed on a substrate 302, and a primary electrochromic (PEC) layer 320 disposed on the upper surface of the lower transparent conductor layer 310. The electrochromic device 300a further contains an ion conductor (IC) layer 330 disposed on the upper surface of the primary electrochromic layer 320, a secondary electrochromic (SEC) layer 340 disposed on an upper surface of the ion conductor layer 330, an upper transparent conductor (TC) layer 350 disposed on an upper surface of the secondary electrochromic layer 340, and an antireflection (AR) layer 360 disposed on an upper surface of the upper transparent conductor layer 350.

Figure 3B:
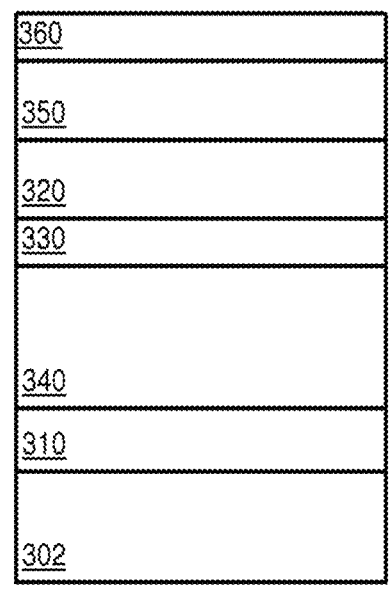

In another embodiment described herein, FIG. 3B depicts an electrochromic device 300b, such as an electrochromic multilayer stack, that contains a lower transparent conductor layer 310 disposed on a substrate 302, and a secondary electrochromic layer 340 disposed on the upper surface of the lower transparent conductor layer 310. The electrochromic device 300b further contains an ion conductor layer 330 disposed on the upper surface of the secondary electrochromic layer 340, a primary electrochromic layer 320 disposed on an upper surface of the ion conductor layer 330, an upper transparent conductor layer 350 disposed on an upper surface of the primary electrochromic layer 320, and an antireflection layer 360 disposed on an upper surface of the upper transparent conductor layer 350.

A Method of Manufacturing the Device in Embodiment B:

Spray pyrolysis, which is often used to produce particles, is first used with reduced solvent in the spray to produce large grains (e.g., a grain size within a range from about 20 nm to about 400 nm) of V—$WO_3$ or $TiO_2$ onto a glass substrate coated with $SnO_2$:F. The next spray pyrolysis for $WO_3$ should contain more solvent than normal in order to induce the spray droplets to spread out and planarize over rough grains to form a relatively smooth film. The next film layers of IC/SEC/TC are then deposited on top.

Alternative Embodiment C

In another embodiment (Embodiment C) described herein, by utilizing two sets of isolation lines where some of the lines for the top TC overlap some of the lines for the bottom TC, bus bars can be applied to the upper and lower TC layers inexpensively with minimal edge leakage currents. Alternatively, to increase the chance of overlapping, the number of bottom isolation lines may be increased (e.g., tripled) in the areas of overlap with the top isolation lines.

FIGS. 3A-3B depict electrochromic devices 300a and 300b, respectively, which may be utilized as an electrochromic multilayer stack by embodiments illustrated in FIGS. 4A-4E.

In one embodiment, a bus bar application involves depositing the TC and the PEC (or SEC) layers through a first patterning mask. A second patterning mask with an opening area larger than that of the first patterning mask may then be used to deposit the IC layer. A third patterning mask with an opening area smaller than that of the first patterning mask is finally used to deposit the rest of the layers. The three masks are used in order to prevent the upper TC layers from shorting with the lower TC layers, and to allow bus bars to be applied to the upper and lower TC layers without shorts. This device structure is cumbersome and expensive to make.

Figure 4A:
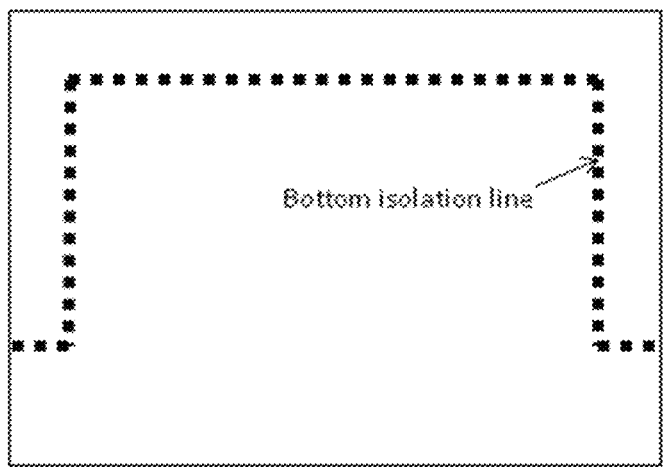
FIGS. 4A-4E depict electrochromic devices as described by another embodiment herein.
Figure 4B:
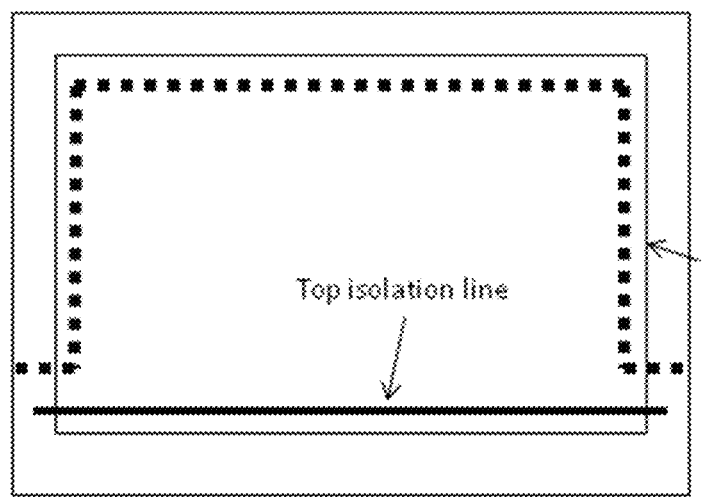
Figure 4C:
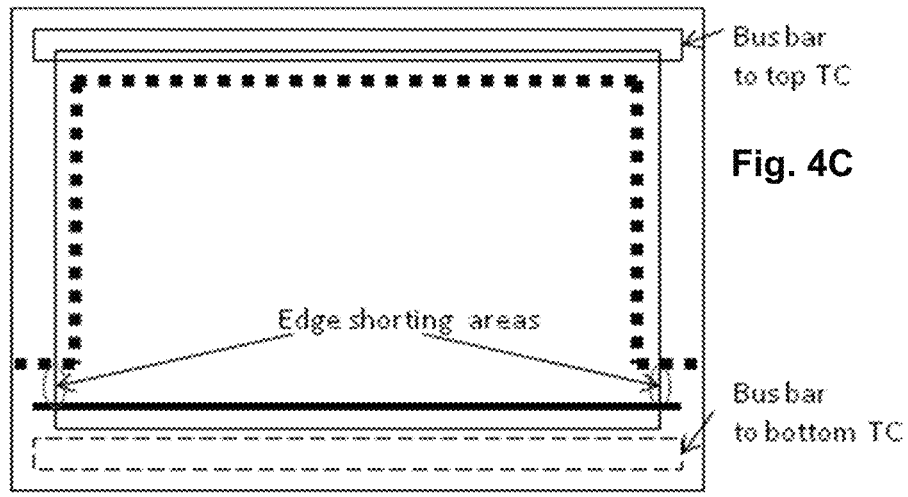

In another embodiment, a bus bar application may utilize a single patterning mask and 2 sets of isolation lines. To start, bottom isolation lines may be scribed into a substrate pre-coated with a TC layer, creating 2 electrically isolated zones (FIG. 4A). The next EC layers PEC/IC/SEC/TC may then be deposited over the bottom isolation lines through a shadow mask (FIG. 4B). Next, the top isolation line may be applied that cuts through the upper TC layer but not the lower TC layer, creating 2 electrically isolated zones for the upper TC layer. Finally, an optional antireflection and protection layer and the bus bars connecting to the upper and lower TC layers may be applied (FIG. 4C). The isolation lines may be scribed or otherwise formed via sandblasting, grinding wheel, laser ablation, or other techniques. The bus bars may be applied via silk screen, electroplating, ultrasonic soldering, or other techniques. The process to form this device structure may be simpler and more cost-effective than the device structure above, except for the leakage current at the edges in the areas between the top and bottom isolation lines as shown in FIG. 4C. Depending on the film deposition technique and especially for spray pyrolysis, the leakage current can be significant, arising from the multilayer films contacting each other at the edges.

Figure 4D:
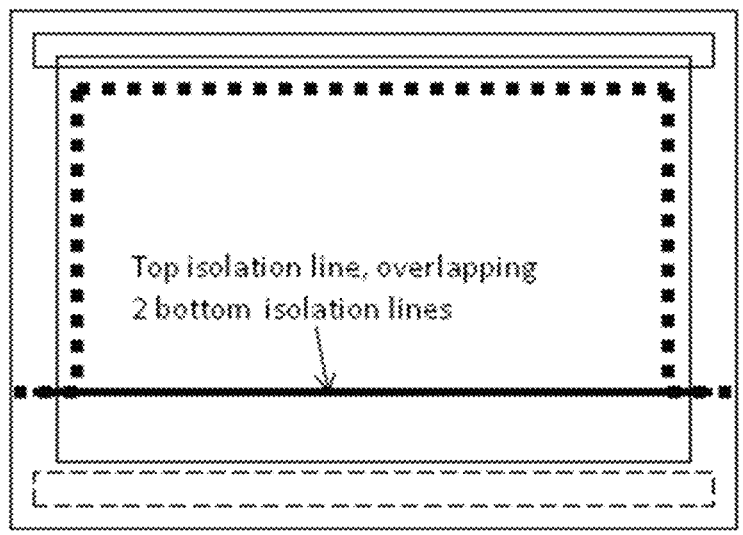
Figure 4E:
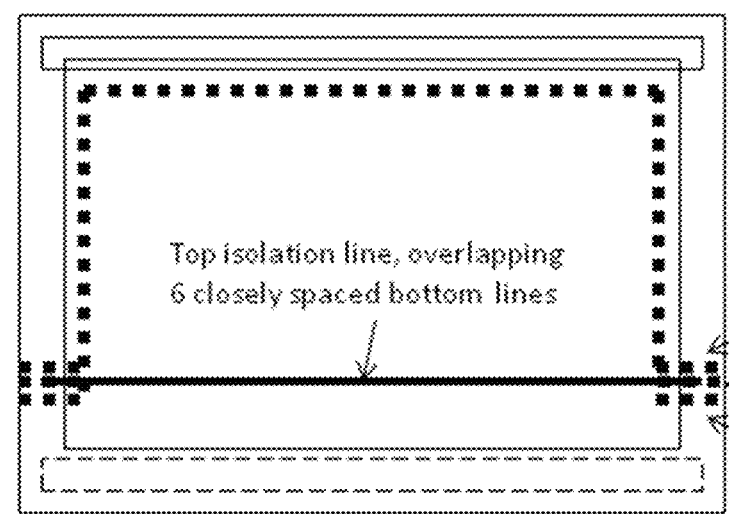

In another embodiment, a device structure may be utilized to reduce such edge leakage current. In the first structure, the top isolation overlaps the 2 short bottom isolation lines as shown in FIG. 4D. Additionally, the 2 short bottom isolation lines are wider than the top isolation line to increase the chance or likelihood of overlapping. In the second structure, the 2 bottom isolation lines are increased to 6 or more closely spaced lines (as closely spaced as possible) as shown in FIG. 4E in order to increase the chance for overlapping with the top isolation line.

Alternative Embodiment D

In another embodiment (Embodiment D.1) described herein, an EC device processing technique includes the following:

a) The spray pyrolysis (SP) processes may be used to deposit 2, 3, or more consecutive layers onto 1 substrate, forming monolithic all-solid-state electrochromic devices. By using SP for 2 or more consecutive layers, the same setup may be used to further decrease the production cost.

b) The consecutive SP layers are deposited at similar temperatures, such as within about 100° C. of each other. By selecting consecutive SP deposition processes having similar operating temperatures, the difficult & time-consuming task of changing the substrate temperature uniformly is avoided.

c) Heat treatment of all the SP layers together after they are deposited. By selecting consecutive SP deposition processes having similar heat treatment temperatures, the difficult & time-consuming task of heating the substrate to a certain temperature uniformly only has to be done once.

In another embodiment (Embodiment D.2) described herein, EC device processing technique includes the following:

a) The SP processes may be used to deposit 2, 3, or more consecutive layers onto 1 substrate, forming monolithic all-solid-state electrochromic devices. By using SP for 2 or more consecutive layers, the same setup may be used to further decrease the production cost.

b) The consecutive SP layers are deposited & heat treated at different temperatures. Although large temperature changes (heating & cooling) may be utilized, there is more flexibility in selecting the optimal SP process for each layer.

In another embodiment (Embodiment D.3) described herein, an EC device processing technique includes the following:

a) The SP processes may be used to deposit 2, 3, or more consecutive layers onto 1 substrate, forming monolithic all-solid-state electrochromic devices. By using SP for 2 or more consecutive layers, the same setup may be used to further decrease the production cost.

b) The consecutive SP layers are deposited at similar temperatures, such as within about 100° C. of each other. By selecting consecutive SP deposition processes having similar operating temperatures, the difficult and time-consuming task of changing the substrate temperature uniformly is avoided.

c) Separate heat treatment after each SP deposition of layer. Although more temperature changes may be utilized, there is more flexibility in selecting the optimal heat treatment process for each layer.

In another embodiment (Embodiment D.4) described herein, an EC device processing technique includes the following:

a) The SP processes may be used to deposit 2, 3, or more consecutive layers onto 1 substrate, forming monolithic all-solid-state electrochromic devices. By using SP for 2 or more consecutive layers, the same setup may be used to further decrease the production cost.

b) The consecutive SP layers are deposited at the different temperatures. Although more temperature cycles may be utilized, there is more flexibility in selecting the optimal SP process for each layer.

c) Heat treatment of all the SP layers together after they are deposited. By selecting consecutive SP deposition processes having similar heat treatment temperatures, the difficult & time-consuming task of heating the substrate to a certain temperature uniformly only has to be done once.

Variations of Embodiments D.1-D.4 include, but are not limited to, the following:

The SP processes can use a typical atomizers based on pressure, electrostatic, ultrasonic, or combinations thereof.

Deposit the upper TC layer via SP, sputtering, or other deposition techniques.

Deposit the optional top protective and/or AR layer via SP, sputtering, or other deposition techniques. Alternatively, a transparent sheet of plastic or glass can be attached on top of the multilayer stack.

The ions are generally $Li^+$ and/or $H^+$.

The ions are introduced to one or more layers during SP processes.

Embodiment D.1

SP Deposition of Multilayer PEC/IC/SEC/TC/Optional Antireflection Layer onto a Glass Substrate Coated with a Lower TC Layer First layer: Lower TC is pyrolyticly deposited while the glass was made by the glass manufacturer. A popular TC layer commercially sold with glass is fluorine-doped tin oxide (FTO). The bottom TC can also be deposited onto the glass substrate via sputtering, thermal evaporation, or CVD.

Second layer: A primary or secondary EC layer, deposited via SP. A cathodic electrochrome gets darker with ion insertion. Several examples of primary electrochrome materials may include tungsten oxides, such as tungsten trioxide ($WO_3$), molybdenum oxides, such as molybdenum trioxide ($MoO_3$), niobium oxides, such as niobium pentoxide ($Nb_2O_5$), derivatives thereof, or combinations thereof. In one example, a SP deposition process of $WO_3$ may be conducted as follows. A precursor may be formed by dissolving $WO_3$ powder in hot ammonia and distilled water, with overall solution concentration of about 0.2 M. The solution is heated to about 90° C. which leads to the formation of ammonium tungstate, via the following reaction:

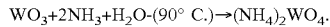

$$WO_3 + 2NH_3 + H_2O\text{-}(90°\ C.) \rightarrow (NH_4)_2WO_4.$$

The solution is then pyrolyticly sprayed onto the TC-coated glass substrate with a carrier gas such as air or nitrogen. With the substrate temperature maintained around 300° C. (+/−100° C.) during the spraying process, the ammonium tungstate is pyrolyticly decomposed to give a uniform and pin-hole free tungsten oxide film, between about 200 nm and about 600 nm thick, via the following reaction:

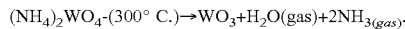

$$(NH_4)_2WO_4\text{-}(300°\ C.) \rightarrow WO_3 + H_2O(gas) + 2NH_{3(gas)}.$$

Third layer: An IC layer may be deposited via a SP process, and contain cations such as $Li^+$, $H^+$, or $Na^+$. Some typical ion conductor materials include silica, alumina, aluminosilicates, lithium silicate, lithium aluminosilicate, tantala or tantalum oxide, zirconium oxide, lithium phosphorous oxynitride (Li—P—O—N), alloys thereof, derivatives thereof, oxides thereof, silicates thereof, or combinations thereof. An example of a SP deposition process of lithium silicate is as follows. A precursor solution may be prepared containing a lithium alkoxide, an organic solvent such as ether, ketone, ester, ethyl alcohol, or hydrocarbon, and tetramethoxysilane or tetraethoxysilane. The solution may then be sprayed onto the substrate heated to about 300° C. (+/−100° C.). The resulting lithium silicate film may have a thickness within a range from about 5 nm to about 500 nm.

Since dust particles can lead to pinholes in the IC layer, surfactants can be added to the spray solution. The droplet sizes can then be increased (or the substrate temperature can be decreased) such that the substrate surface is wetted with a liquid thin film of the solution during layer deposition. Some solution goes under the dust particles via capillary action, leading to better film coverage and a reduction of pinhole size and pinhole quantity. Furthermore, as the solution under the dust particles evaporates and decomposes, the generated gases can lift up the particles, allowing for additional incursion of the solution underneath the dirt particles. After evaporation and decomposition, between about 0.1 wt % (weight percent) to about 10 wt % of the final IC layer may contain residues of the surfactants.

Optionally, after the first IC layer is deposited by spray pyrolysis, an inert gas such as Ar or $N_2$ may be blown across the substrate to remove or move the dust particles. A second IC layer can then be deposited also by spray pyrolysis on top to cover the pinholes in the first IC layer since the original positions of the dust particles have been changed.

Fourth layer: Secondary (or primary) EC layer, deposited via SP. An anodic electrochrome becomes more transparent with ion insertion. Some typical anodic electrochromes are nickel oxides (e.g., NiO or $Ni_2O_3$), $IrO_2$, and Prussian Blue ($Fe_7(CN)_{18}\cdot14H_2O$). An example of a SP deposition process of NiO, an alcoholic solution of $Ni(NO_3)_2\cdot6H_2O$ at 0.25M is prepared as a precursor. The solution is then sprayed onto the substrate at a temperature of about 300° C. (+/−100° C.) to form coatings having a thickness within a range from about 100 nm to about 300 nm, for example, about 150 nm.

If lithium ions $Li^+$ are used, they can be introduced into the multilayer film at this stage. One way to do this is to add a lithium compound to the precursor of the anodic EC layer. Another way is to intercalate the $Li^+$ electrochemically (e.g., wet cycling) into the anodic EC layer after it is deposited. The voltages must be controlled carefully during the electrochemical process in order to prevent the $Li^+$ from going over to the other EC layer, as well as unwanted side reactions.

Fifth layer: The TC layer may be deposited via optionally SP, or via other standard techniques such as sputtering or evaporation. The material may be indium-doped tin oxide (ITO), fluorine-doped tin oxide (FTO), aluminum-doped zinc oxide (AZO), oxides thereof, derivatives thereof, dopant variants thereof, alloys thereof, or combinations thereof. The sheet resistance ($R_s$) of the transparent conductor layer may be within a range from about 1 Ω/sq (ohms per square) to about 50 Ω/sq.

Sixth layer (optional): Antireflective (AR) and protective layer, deposited via optionally SP, or via another thin film deposition technique such as evaporation, sputtering, and CVD. The material can be one of the insulating and transparent oxides, such as silicon oxides (e.g., $SiO_2$), aluminum oxides (e.g., $Al_2O_3$), silicon aluminate, silicates thereof, aluminates thereof, oxides thereof, derivatives thereof, dopant variants thereof, alloys thereof, or combinations thereof. The thickness of layer is chosen such that it enhances (AR effect) the transmission of the whole multilayer film, especially in the photopic spectrum. Before or after the deposition of this sixth layer, the substrate together with its multilayer film is subjected to a heat treatment at a temperature within a range from about 300° C. to about 700° C. in vacuum, an inert gas such as argon, or air for a time period within a range from about 10 minutes to about 30 minutes.

In an alternative embodiment, the sixth layer may be a protective transparent plastic sheet (e.g., having a thickness within a range from about 10 μm to about 1,000 μm) laminated to the stack via a transparent glue. If the sixth layer is a protective transparent plastic sheet, in some examples, a heat treatment of the whole stack may be conducted prior to attaching the plastic sheet to the stack in order to avoid melting the protective transparent plastic sheet.

A Method of Manufacturing for Embodiment D.1

Figure 5:
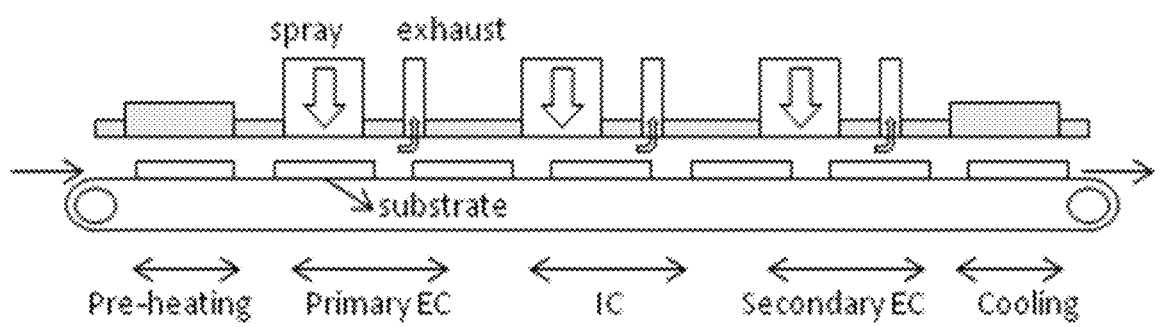
FIG. 5 depicts an apparatus for manufacturing electrochromic devices, as described by embodiments herein.

In another embodiment described herein, FIG. 5 depicts an apparatus for manufacturing for electrochromic devices, as described by embodiments herein, such as for Embodiment D.1.

As shown schematically in FIG. 5, the substrates can be cleaned and introduced onto the belt carrier where they go through different zones. In the pre-heating zone, the substrates can be heated uniformly to a desired temperature (e.g., 300° C. in this embodiment) and moved to the next three zones where the primary EC, the IC, and the secondary EC can be deposited consecutively. The substrates can then enter the cooling zone before further processing (not shown in FIG. 5) involving post-deposition heat treatment, in a batch process to save time, and transparent conductor and protection and/or antireflection coatings. Optionally, more zones can be introduced to the system in FIG. 5 to perform these additional processes. Furthermore, heating zones can optionally be added in between the deposition zones in order to maintain or change the substrate temperature, especially for the embodiments that may be utilized different pyrolytic temperatures for different layers.

It is noted that the electrochromic device fabrication methods described above can be particularly suitable for use in mass manufacture of architectural windows. Generally, although not invariable, architectural windows can have relatively large dimensions, e.g., a length or width greater than about 0.1 meters and up to about 5 meters or even larger. By way of example, and not by way of limitation, a practical range for the dimensions (length and width) of architectural windows that include electrochromic devices of the types described herein can be between about 2.5 meters and about 3 meters.

Embodiment D.2, Corresponding to Solution D.2

The details of this Embodiment D.2 is the same as Embodiment D.1, except:
The SP pyrolytic temperatures are no longer similar to each other, hence utilizing substrate heating or cooling in between each deposition of layer. For the same chemical solutions described in Embodiment 1.1 above, the different pyrolytic temperatures may be: primary EC→about 250° C., ion conductor→about 650° C., secondary EC→about 400° C.
The final heat treatment conducted at a temperature within a range from about 300° C. to about 700° C. is replaced by optional individual heat treatments after the deposition of each layer, with each heat-treatment temperature experimentally selected to give the best film properties.

Embodiment D.3, Corresponding to Solution D.3

The details of this Embodiment D.3 is the same as Embodiment D.1, except:
The final heat treatment conducted at a temperature within a range from about 300° C. to about 700° C. is replaced by optional individual heat treatments after the deposition of each layer, with each heat-treatment temperature experimentally selected to give the best film properties.

Embodiment D.4, Corresponding to Solution D.4

The details of this Embodiment D.4 is the same as Embodiment D.1, except:
The SP pyrolytic temperatures are no longer similar to each other, hence utilizing substrate heating or cooling in between each deposition of layer. For the same chemical solutions described above, the different pyrolytic temperatures would now be: primary EC→about 250° C., ion conductor→about 650° C., secondary EC→about 400° C.

Several Other Alternative Embodiments and Examples

In one embodiment, an electrochromic device comprising an IC layer disposed between a primary electrochromic (PEC) layer and a secondary electrochromic (SEC) layer, wherein the IC layer comprises a high-temperature hygroscopic material at a concentration between about 1 wt % to about 30 wt % are included within one or more of the IC layer, the PEC layer, or the SEC layer.

In one example, water is introduced and retained by the hygroscopic materials. In another example, the device is a lithium ion-based electrochromic device. In another example, the device is a proton-based electrochromic device. In another example, the IC layer comprises one or more ion conductor material, exemplary ion conductor material may be selected from tantalum oxide, zirconium oxide, boron oxide, lithium phosphorous oxynitride (Li—P—O—N), lithium silicate (Li—Si—O), lithium aluminate (Li—Al—O), lithium silialuminate (Li—Si—Al—O), alloys thereof, hydrates thereof, derivatives thereof, or combinations thereof. In another example, the ion conductor material is selected boron oxide, zirconium oxide, derivates thereof, or combinations thereof. In another example, the IC layer contains a concentration by weight of the ion conductor material within a range from about 0.5% to about 30%. In another example, the concentration of the ion conductor material is within a range from about 1% to about 10%. In another example, the IC layer comprises water. In another example, the IC layer contains a concentration by weight of the water within a range from about 0.1% to about 30%. In another example, the PEC layer or the SEC layer comprises a hygroscopic material. In another example, the hygroscopic material is selected from boron oxide, zirconium oxide, derivates thereof, or combinations thereof. In another example, the PEC layer or the SEC layer contains a concentration by weight of the hygroscopic material within a range from about 0.5% to about 30%. In another example, the concentration of the hygroscopic material is within a range from about 1% to about 10%. In another example, the PEC layer or the SEC layer comprises water. In another example, the PEC layer or the SEC layer contains a concentration by weight of the water within a range from about 0.1% to about 30%.

In another embodiment, an electrochromic device, comprising: an electrochromic stack having an IC layer disposed between a PEC layer and a secondary electrochromic (SEC) layer; upper and lower conductor layers, wherein the electrochromic stack is disposed between the upper and lower conductor layers; a hydrophobic protective layer disposed on the upper conductor layer to prevent water from escaping from the electrochromic stack.

In one example, the hydrophobic protective layer comprises a hydrophobic material selected from zinc dioxide, titanium oxide, silicon oxide, derivatives thereof, dopant variants thereof, or combinations thereof. In another example, the hydrophobic material comprises a hydrophobic polymer. In another example, the upper and lower conductor layers are transparent. In another example, the thickness of the hydrophobic material layer is selected such that the hydrophobic material layer acts as an anti-reflection layer. In another example, the method further comprises an anti-reflection layer disposed on the upper conductor layer. In other examples, the device is a battery. In another example, the battery is a lithium-ion-based battery, a proton-based battery, or a thin film battery.

In another embodiment, a method for fabricating an electrochromic device, comprising: forming an IC layer on a PEC layer disposed on a substrate; and forming a secondary electrochromic (SEC) layer on the IC layer; wherein the IC layer, the PEC layer, or the SEC layer independently comprises a high-temperature hygroscopic material at a concentration within a range from about 1 wt % to about 30 wt %.

In another example, the method further comprises introducing water to be retained by the hygroscopic material. In another example, the IC layer is deposited via spray pyrolysis, sol-gel deposition, sputtering, CVD, electroplating, thermal or electron beam evaporation. In another example, the IC layer comprises one or more ion conductor material selected from tantalum oxide, zirconium oxide, boron oxide, lithium phosphorous oxynitride (Li—P—O—N), lithium silicate (Li—Si—O), lithium aluminate (Li—Al—O), lithium silialuminate (Li—Si—Al—O), alloys thereof, hydrates thereof, derivatives thereof, or combinations thereof. In another example, the method further comprises hydrating the hygroscopic material before sealing the device for operation.

In another example, the IC layer includes the high-temperature hygroscopic material. In another example, the PEC layer or the SEC layer also includes hygroscopic material. In another example, the PEC layer or the SEC layer also includes hygroscopic material.

In another embodiment, a method for fabricating an electrochromic device, comprising: forming an electrochromic stack having an IC layer between a PEC layer and a secondary electrochromic (SEC) layer; disposing the electrochromic stack between upper and lower conductor layers; disposing a hydrophobic material on the upper and lower conductor layers to prevent water from escaping from the electrochromic stack.

In another example, the hydrophobic material is selected from zinc dioxide, titanium oxide, silicon oxide, derivatives thereof, dopant variants thereof, or combinations thereof. In another example, the hydrophobic material comprises a hydrophobic polymer.

In another embodiment, an electrochromic material structure, comprising a large-grain thin film mixture of a first cathodic electrochrome that becomes more transparent upon ion intercalation, and a second cathodic electrochrome of similar refractive index in a bleached state and different refractive index in a colored state.

In another embodiment, an electrochromic material structure, comprising a large-grain thin film mixture of a first cathodic electrochrome that becomes more transparent upon ion intercalation, and an ion conductor of similar refractive index in a bleached state and different refractive index in a colored state. In another example, the cathodic electrochromic materials include $WO_3$, $MoO_3$, or $Nb_2O_5$. In another example, the first cathodic electrochrome includes grains having a grain size within a range from about 20 nm to about 400 nm.

In another embodiment, an electrochromic material structure, comprising: a large-grain thin film mixture of a first anodic electrochrome that becomes darker upon ion intercalation, and a second anodic electrochrome of similar refractive index in a bleached state and different refractive index in a colored state.

In another embodiment, an electrochromic material structure, comprising: a large-grain thin film mixture of a first anodic electrochrome that becomes darker upon ion intercalation, and an ion conductor material of similar refractive index in a bleached state and different refractive index in a colored state.

In another example, the anodic electrochromic materials include NiO, $IrO_2$, or $Cr_2O_3$. In another example, the anodic electrochrome contains grains having a grain size within a range from about 20 nm to about 400 nm. In another example, the ion conductor material is selected from tantalum oxide, zirconium oxide, boron oxide, lithium phosphorous oxynitride (Li—P—O—N), lithium silicate (Li—Si—O), lithium aluminate (Li—Al—O), lithium silialuminate (Li—Si—Al—O), alloys thereof, hydrates thereof, derivatives thereof, or combinations thereof.

In another embodiment, a method of manufacturing an electrochromic structure, comprising: using spray pyrolysis with reduced solvent in a spray to produce large grains of V—$WO_3$ or $TiO_2$ onto a glass substrate coated with $SnO_2$:F; and using spray pyrolysis with $WO_3$ containing more solvent than normal in order to induce the spray droplets to spread out and planarize over rough grains to form a relatively smooth film.

In another example, the method further comprises depositing film layers of an IC, a complementary electrochromic layer and a TC on top of the electrochromic structure. In another example, the large grains have a grain size within a range from about 20 nm to about 400 nm.

In another embodiment, an electrochromic device, comprising: an electrochromic stack having an IC layer disposed between a PEC layer and a secondary electrochromic (SEC) layer that is complementary to the PEC layer; first and second TC layers, wherein the electrochromic stack is disposed between the first and second TC layers, wherein the first TC layer is at a bottom of the electrochromic stack adjacent to the substrate divided into two electrically isolated sections by one or more isolation lines and wherein the second TC layer on top is divided into two electrically isolated sections by one or more isolation lines, where some of the lines for the first TC overlap some of the lines for the second TC; and a first bus bar applied to the first TC layer and a second bus bar applied to the second TC layer inexpensively with minimal edge leakage currents.

In another example, a number of isolation lines in the first TC layer at the bottom are increased with one or more areas of overlap with the isolation lines in the second TC layer on top. In another example, the one or more isolation lines in the second TC layer overlaps 2 isolation lines in the first TC layer. In another example, the 2 isolation lines in the first TC layer are made wider than the isolation lines in the second TC layer to enhance a chance of overlapping. In another example, the one or more bottom isolation lines in the first TC layer include 6 or more closely spaced lines in order to increase the chance for overlapping with the top isolation line.

In another embodiment, a method for fabricating an electrochromic device using spray pyrolysis comprising: depositing a first TC and an electrochromic (EC) layer through a first patterning mask; depositing an IC layer on the EC layer through a second patterning mask having an opening area larger than an opening area of the first patterning mask; depositing one or more additional layers including a second EC layer complementary to the first EC layer and a second TC layer on the EC layer through a third patterning mask having an opening area smaller than that of the first patterning mask, wherein the three masks are configured to prevent the first TC layer from shorting with the second TC layer, and allow bus bars to be applied to the first and second TC layers without shorts.

In another embodiment, a method for fabricating an electrochromic device using a single patterning mask and 2 sets of isolation lines, the method comprising: forming bottom isolation lines into a substrate pre-coated with a first TC layer to create 2 electrically isolated sections; depositing a PEC layer, IC layer, secondary electrochromic (SEC) layer and second TC layer over the bottom isolation lines through a shadow mask; applying a top isolation line that cuts through the second TC layer but not the first TC layer, creating 2 electrically isolated sections for the second TC layer; connecting a first bus bar to the first TC layer and a second bus bar to the second TC layer.

In another example, the method further comprises forming an antireflection and protection layer on the first and second TC layers. In another example, the isolation lines are formed in the first or second TC layer via sandblasting, grinding wheel, or laser ablation. In another example, the bus bars are applied via silk screen, electroplating, or ultrasonic soldering processes. In another example, the devices and methods where at least 1 of the layers is deposited using spray pyrolysis.

In another embodiment, an electrochromic device applied to a substrate comprising an ion conductor disposed between a primary electrochromic layer and a secondary electrochromic layer, with all three layers being deposited by spray pyrolysis at similar substrate pyrolytic temperatures, being heat treated together at the same temperature after the three depositions, and having porous structures to enhance ionic conductivity. In another embodiment, an electrochromic device applied to a substrate comprising an ion conductor disposed between a primary electrochromic layer and a secondary electrochromic layer, with all three layers being deposited by spray pyrolysis and having porous structures to yield higher ionic conductivity.

In another embodiment, an electrochromic device applied to a substrate comprising an ion conductor disposed between a primary electrochromic layer and a secondary electrochromic layer, with all three layers being deposited by spray pyrolysis at similar substrate pyrolytic temperatures, and having porous structures to yield higher ionic conductivity. In another embodiment, an electrochromic device applied to a substrate comprising an ion conductor disposed between a primary electrochromic layer and a secondary electrochromic layer, with all three layers being deposited by spray pyrolysis, being heat treated at the same temperature after the three depositions, and having porous structures to yield higher ionic conductivity.

In another example, the ion conductor layer has a thickness within a range from about 5 nm to about 1,000 nm. In another example, the ion conductor layer has low electronic conductivity compared to its ionic conductivity. By way of example, as used herein "low electronic conductivity" means the ionic conductivity is at least 5 times higher than the electronic conductivity. In another example, the IC is configured to conduct lithium ions and/or protons. In another example, the ions are introduced to one or more layers during the spray pyrolysis processes. In another example, the at least one of the three layers comprises primarily an inorganic oxide material. In another example, one or both of the primary and secondary electrochromic layers include lithium ions and/or protons within. In another example, the three layers are disposed between first and second transparent conductor layers. In another example, the at least one of the two transparent conductor layers is deposited by spray pyrolysis to form a 5-layer stack. In another example, a protective and/or AR top layer is deposited on top of the 5-layer stack. In another example, the top layer is deposited by spray pyrolysis. In another example, the spray pyrolysis processes use an atomizer based on pressure, electrostatic, ultrasonic, or a combination. In another example, all three layers cover an area on the substrate having a length and/or width that is greater than 0.1 meters.

In another embodiment, a method for fabricating an electrochromic device applied to a substrate, the device having at least three layers including an ion conductor disposed between a primary electrochromic layer and a secondary electrochromic layer, the method comprising: depositing the primary electrochromic layer on a substrate, depositing the ion conductor and the secondary electrochromic layer on the primary electrochromic layer such that the ion conductor layer is disposed between the primary and secondary electrochromic layers, wherein two or more layers of the primary electrochromic layer, ion conductor layer and secondary electrochromic layer are deposited by spray pyrolysis at similar substrate pyrolytic temperatures; and heat treating the two or more layers together at a common temperature after the three depositions. In another embodiment, a method for fabricating an electrochromic device applied to a substrate, the device having at least three layers including an ion conductor disposed between a primary electrochromic layer and a secondary electrochromic layer, the method comprising: depositing two or more of the three layers on top of one another by spray pyrolysis. In another embodiment, a method for fabricating an electrochromic device applied to a substrate, the device having at least three layers including an ion conductor disposed between a primary electrochromic layer and a secondary electrochromic layer, the method comprising: depositing two or more of the three layers by spray pyrolysis at similar substrate pyrolytic temperatures.

In another embodiment, a method for fabricating an electrochromic device applied to a substrate, the device having at least three layers including an ion conductor disposed between a primary electrochromic layer and a secondary electrochromic layer, the method comprising: depositing two or more of the three layers by spray pyrolysis; and heat treating the two or more layers together at a common temperature after the three depositions.

In another example, the ion conductor layer has a thickness within a range from about 5 nm to about 1,000 nm. In another example, the ion conductor layer has low electronic conductivity compared to its ionic conductivity. By way of example, as used herein "low" means the ionic conductivity is at least 5 times higher than the electronic conductivity. In another example, the IC is configured to conduct lithium ions and/or protons. In another example, the ions are introduced into the one or more layers during the spray pyrolysis processes. In another example, at least one of the three layers comprises primarily an inorganic oxide material. In another example, one or both of the primary and secondary electrochromic layers contain lithium ions and/or protons. In another example, the ions are introduced to one or more layers during the spray pyrolysis. In another example, the three layers are disposed between first and second transparent conductor layers. In another example, wherein at least one of the two transparent conductor layers is deposited by spray pyrolysis to form a 5-layer stack. In another example, wherein a protective and/or AR top layer is deposited on top of the 5-layer stack. In another example, the top layer is deposited by spray pyrolysis. In another example, the spray pyrolysis processes use an atomizer based on pressure, electrostatic, ultrasonic, or a combination. In another example, the spray pyrolysis and heat treatment processes porous structures characterized by high ionic conductivity.

In another embodiment, an IC, comprising: a layer of IC material; and surfactant materials incorporated into the IC layer.

In another embodiment, a method for fabricating an IC, comprising: depositing a first IC layer using spray pyrolysis; adding surfactants to the spray pyrolysis solution for the IC layer in order to reduce the number and size of pinholes in the final IC layer. In another embodiment, a method for fabricating an IC, comprising: depositing a first IC layer using spray pyrolysis; blowing an inert gas across the first IC layer to remove or move dust particles from the first IC layer; and depositing a second IC layer on the first IC layer using spray pyrolysis.

In other embodiments, electrochromic material structures, methods for fabricating electrochromic material structures, electrochromic devices, methods for fabricating an electrochromic device using a single patterning mask and 2 sets of isolation lines, an electrochromic device applied to a substrate, a method for fabricating an electrochromic device applied to a substrate, and a method for fabricating an IC, wherein multiple layers are deposited by spray pyrolysis on a common substrate and annealed together at a common temperature as described above. In addition, a monolithic all-solid-state electrochromic stack where one or more or all of layers are planarizing layers to reduce roughness, haze, pinholes, and electrical shorts.

While the foregoing is directed to embodiments of the invention, other and further embodiments of the invention may be devised without departing from the basic scope thereof, and the scope thereof is determined by the claims that follow.

What is claimed is:

1. An electrochromic device comprising a plurality of layers, including at least one planarizing layer, which primarily comprises an inorganic oxide and has an upper surface roughness which is less than or equal to half of the upper surface roughness of an underlying layer in contact with a lower surface of the at least one planarizing layer, wherein at least valleys of the underlying layer are filled by the lower surface of the at least one planarizing layer.

2. The electrochromic device of claim 1, comprising:
at least one substrate;
a lower transparent conductor layer;
a first electrochromic layer;
an ion conductor layer;
a second electrochromic layer; and
an upper transparent conductor layer,
wherein: (a) the first electrochromic layer is a primary electrochromic layer and the second electrochromic layer is a secondary electrochromic layer, or (b) the first electrochromic layer is the secondary electrochromic layer and the second electrochromic layer is the primary electrochromic layer.

3. The electrochromic device of claim 2, wherein:
the secondary electrochromic layer comprises a composition represented by the formula $Li_aNiM1_xM2_yO_z$, where M1 and M2 are different elements and are selected from the group consisting of B, Mn, Ti, Co, Zr, Al, P, Si, Ru, Ta, Nb, Mo, W, Ir, V, Cr, N, and combinations thereof, where a is from 1 to 5; x is from 0 to 1; y is from 0 to 1; and z is from 1.5 to 6, provided that $x+y>0$.

4. The electrochromic device of claim 3, wherein a is 1.5 to 4.5.

5. The electrochromic device of claim 3, wherein x is 0.5 to 0.8.

6. The electrochromic device of claim 3, wherein y is 0.05 to 0.1.

7. The electrochromic device of claim 3, wherein z is 2 to 5.

8. The electrochromic device of claim 3, wherein the secondary electrochromic layer comprises a hygroscopic material.

9. The electrochromic device of claim 3, wherein the secondary electrochromic layer comprises a large-grain thin film mixture, wherein a refractive index of a component material of the secondary electrochromic layer is similar to a refractive index in a bleached state, but different from a refractive index in a colored state, of remaining component materials of the secondary electrochromic layer.

10. The electrochromic device of claim 3, wherein a Li ion storage capacity of the secondary electrochromic layer is at least 100 $mC/cm^2/um$.

11. The electrochromic device of claim 3, wherein a coloration efficiency of the secondary electrochromic layer is lower than 30 $cm^2/C$.

12. The electrochromic device of claim 3, wherein the secondary electrochromic layer has a transmittance of at least 50% of light in a bleached state, and no more than 20% of light in a colored state, where the light has a wavelength within a range from 400 nm to 950 nm.

13. The electrochromic device of claim 3, wherein the secondary electrochromic layer is formed from a precursor solution comprising a nickel precursor selected from the group consisting of nickel nitrate, nickel acetate, nickel chloride, nickel acetylacetonate and nickel carbonate hydroxide, and a lithium precursor selected from the group consisting of lithium nitrate, lithium carbonate, lithium acetate, lithium hydroxide, and lithium trifluoromethanesulfonate.

14. The electrochromic device of claim 3, wherein there is only one substrate and the layers constitute a monolithic stack.

15. The electrochromic device of claim 3, wherein there are two substrates and the electrochromic device is in a form of a laminate.

* * * * *